US010227180B2

(12) United States Patent
Nally et al.

(10) Patent No.: US 10,227,180 B2
(45) Date of Patent: Mar. 12, 2019

(54) ROBOTIC PLACEMENT MACHINE FOR OPTICAL BONDING, SYSTEM AND METHOD OF USE THEREOF

(71) Applicant: Precision Valve & Automation, Inc., Cohoes, NY (US)

(72) Inventors: Andrew John Nally, Greenfield, NY (US); Jeffrey James VanNorden, Clifton Park, NY (US); Jonathan Neal Urquhart, Saratoga Springs, NY (US)

(73) Assignee: PRECISION VALVE & AUTOMATION, INC., Cohoes, NY (US)

( * ) Notice: Subject to any disclaimer, the term of this patent is extended or adjusted under 35 U.S.C. 154(b) by 1375 days.

(21) Appl. No.: 13/845,978

(22) Filed: Mar. 18, 2013

(65) Prior Publication Data

US 2013/0272835 A1 Oct. 17, 2013

Related U.S. Application Data

(62) Division of application No. 13/009,385, filed on Jan. 19, 2011, now abandoned.

(51) Int. Cl.
*B65G 47/26* (2006.01)
*B05C 5/02* (2006.01)

(52) U.S. Cl.
CPC ............ *B65G 47/26* (2013.01); *B05C 5/0216* (2013.01); *B05C 5/0275* (2013.01); *B05C 5/0279* (2013.01)

(58) Field of Classification Search
CPC ..... B65G 47/26; B05C 5/0275; B05C 5/0216; B05C 5/0279

(Continued)

(56) References Cited

U.S. PATENT DOCUMENTS 4,215,802 A 8/1980 Ornsteen
4,406,247 A 9/1983 Baughman et al.
(Continued)

FOREIGN PATENT DOCUMENTS

JP  2002126965  *  5/2002
JP  2004314004     11/2004
WO  2008126893     10/2008

OTHER PUBLICATIONS

JP 2002126965 English abstract, dated May 2002.*
(Continued)

*Primary Examiner* — Michael N Orlando
*Assistant Examiner* — Elizabeth Bradford
(74) *Attorney, Agent, or Firm* — Schmeiser, Olsen & Watts, LLP

(57) ABSTRACT

A robotic placement machine including a base operably connected to the Y axis actuator and the X axis actuator, a first Z axis actuator coupled to the first end of the base, the first Z axis actuator capable of moving up and down a first Z axis, a second Z axis actuator coupled to the second end of the base, the second Z axis actuator capable of moving up and down a second Z axis, and a pick and place plate operably connected to the first Z axis actuator and the second Z axis actuator, wherein the first Z axis actuator and the second Z axis actuator are each capable of moving independently of each other to tilt the pick and place plate is provided. Furthermore, a system comprising a first machine, second machine, and third machine to eliminate air bubbles when bonding two substrates is also provided. A method of optical bonding is further provided.

16 Claims, 25 Drawing Sheets

(58) Field of Classification Search
USPC ............ 156/379.6; 294/186, 183; 414/752.1, 414/800, 749.1
See application file for complete search history.

(56) References Cited

U.S. PATENT DOCUMENTS

| | | | |
|---|---|---|---|
| 5,827,394 A * | 10/1998 | Lu .................................. | 156/701 |
| 5,852,484 A | 12/1998 | Inoue et al. | |
| 5,854,664 A | 12/1998 | Inoue et al. | |
| 5,948,194 A | 9/1999 | Hill et al. | |
| 5,978,065 A | 11/1999 | Kawasumi et al. | |
| 6,431,329 B1 | 8/2002 | Huber, Jr. et al. | |
| 7,038,758 B2 | 5/2006 | Suzuki | |
| 7,245,989 B2 * | 7/2007 | Hosek ............... | H01L 21/67742 318/568.11 |
| 7,295,279 B2 | 11/2007 | Byun et al. | |
| 7,349,059 B2 | 3/2008 | Jiang | |
| 7,416,010 B2 * | 8/2008 | Byun ..................... | B32B 37/10 156/580 |
| 7,450,213 B2 | 11/2008 | Kim et al. | |
| 7,710,534 B2 | 5/2010 | Byun et al. | |
| 8,855,818 B2 * | 10/2014 | Hashimoto ................... | 700/250 |
| 9,005,389 B2 * | 4/2015 | Ritzka ................... | B05C 5/0216 156/104 |
| 2003/0011205 A1 * | 1/2003 | Mori et al. ................... | 294/64.1 |
| 2006/0043747 A1 * | 3/2006 | Kniss ..................... | B25J 13/086 294/65 |
| 2006/0216137 A1 * | 9/2006 | Sakata et al. ............ | 414/222.13 |
| 2008/0241508 A1 | 10/2008 | Kuwabara et al. | |
| 2009/0168006 A1 | 7/2009 | Chen et al. | |
| 2009/0218034 A1 | 9/2009 | Kawabe | |
| 2010/0098839 A1 | 4/2010 | Toyoda et al. | |
| 2010/0197187 A1 | 8/2010 | Naraba et al. | |
| 2011/0061406 A1 | 3/2011 | Kleber | |
| 2011/0155318 A1 | 6/2011 | Shibata et al. | |
| 2012/0180935 A1 | 7/2012 | VanNorden et al. | |
| 2012/0234459 A1 | 9/2012 | Nally et al. | |

OTHER PUBLICATIONS

Office Action (dated Jul. 19, 2012) for U.S. Appl. No. 13/009,385, filed Jan. 29, 2011.
Office Action (dated Jan. 16, 2013) for U.S. Appl. No. 13/009,385, filed Jan. 29, 2011.
Office Action (dated Feb. 3, 2014) for U.S. Appl. No. 13/487,448, filed Jun. 4, 2012.
Office Action (dated Sep. 5, 2014) for U.S. Appl. No. 13/487,448, filed Jun. 4, 2012.
Final Office Action (dated Jun. 1, 2016) for U.S. Appl. No. 13/487,448, filed Jun. 4, 2012.
Office Action (dated Nov. 19, 2015) for U.S. Appl. No. 13/487,448, filed Jun. 4, 2012.

* cited by examiner

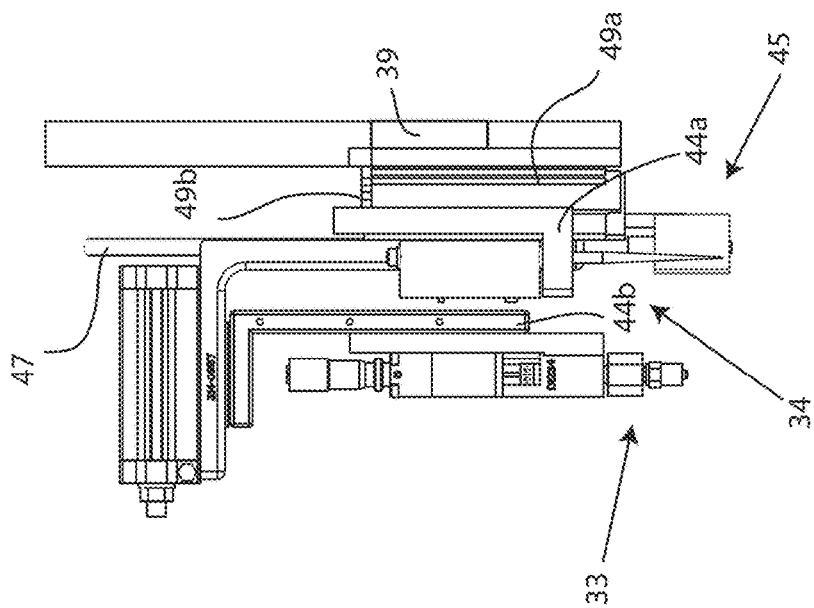
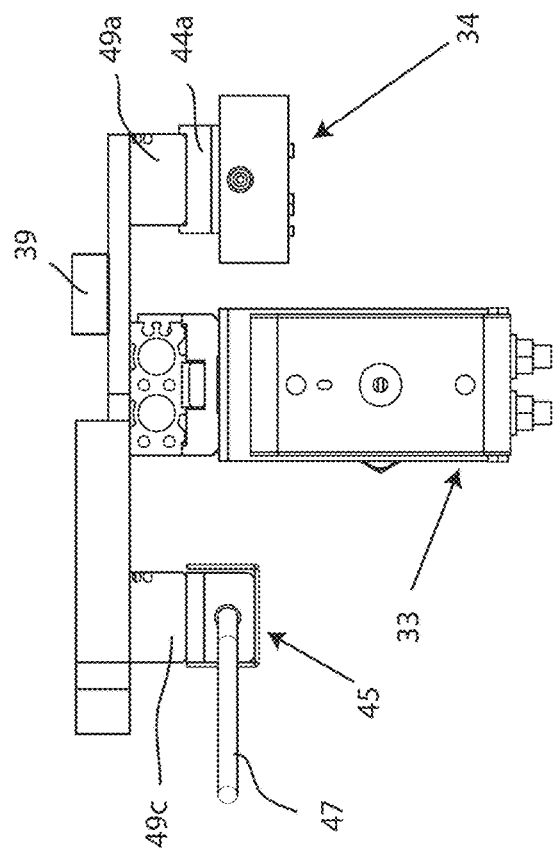

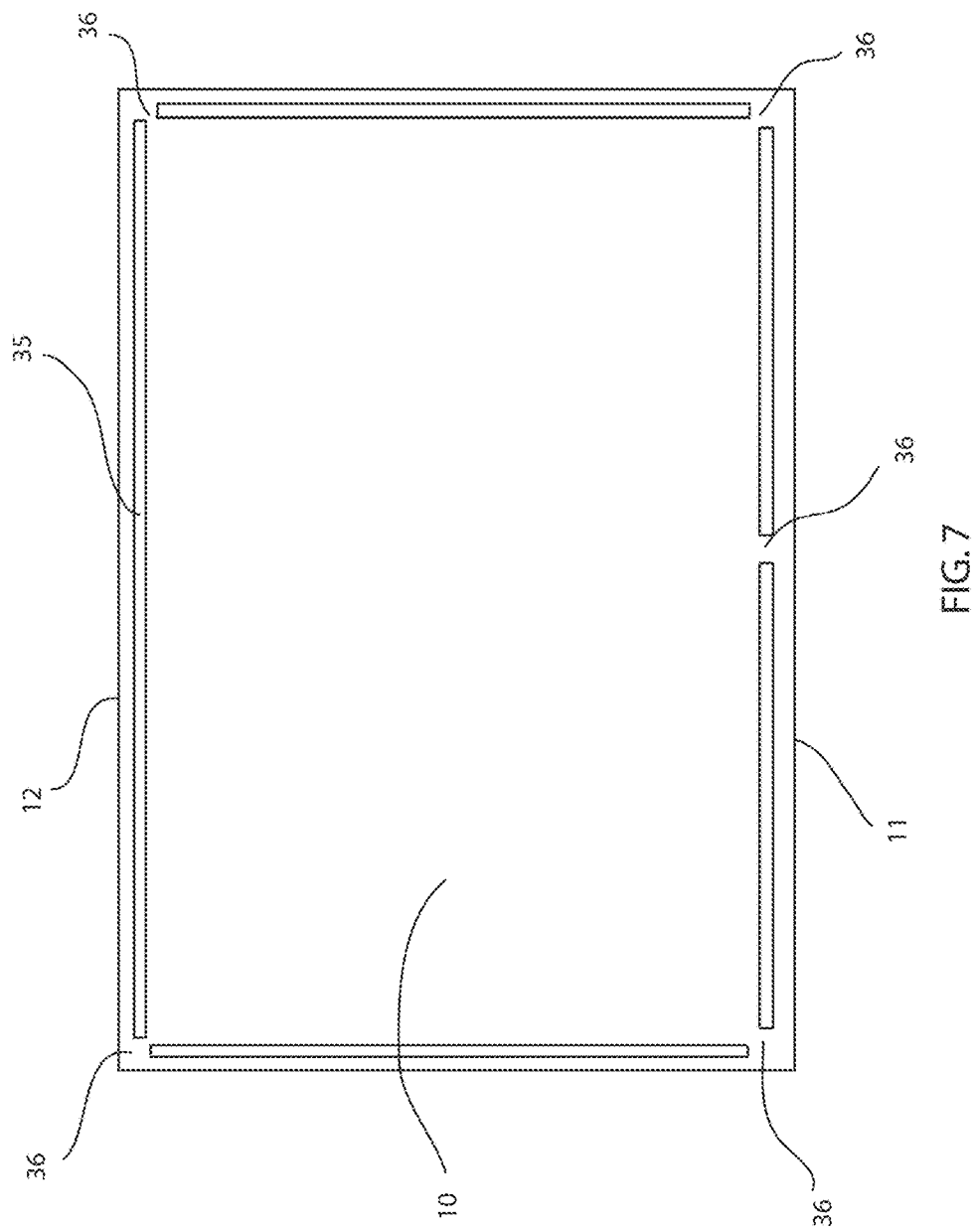

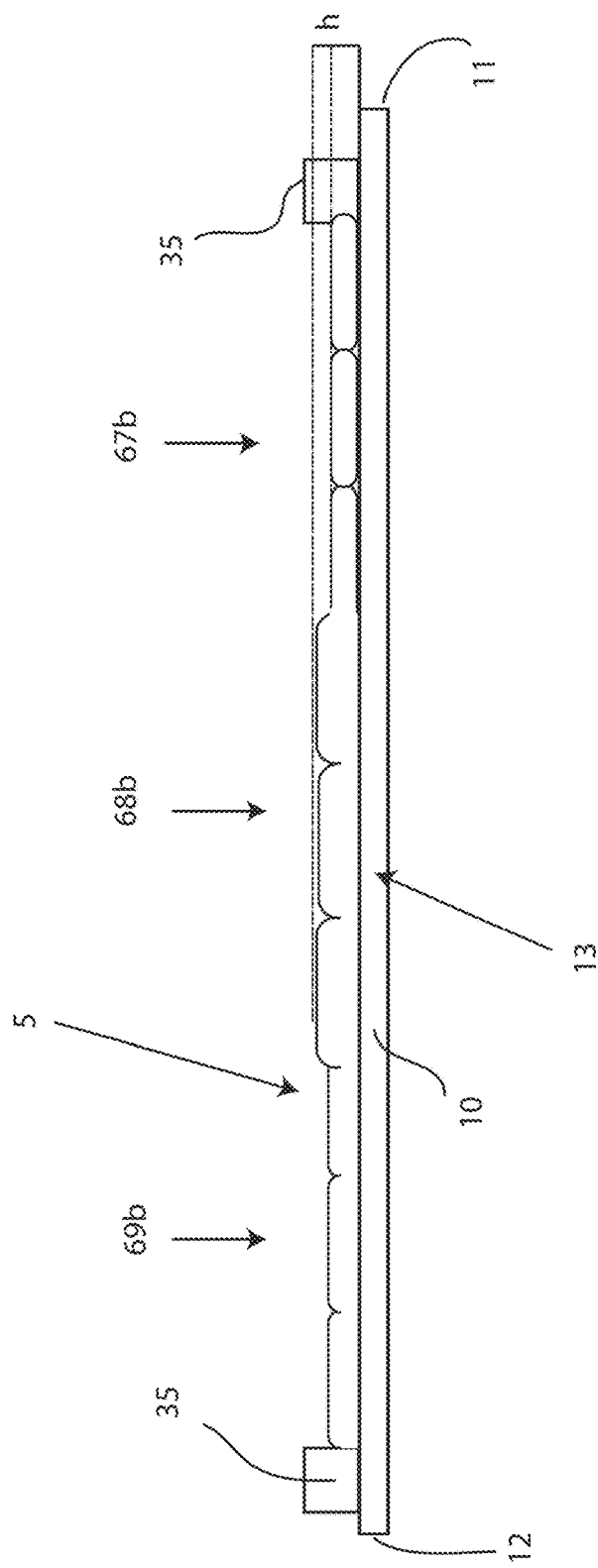

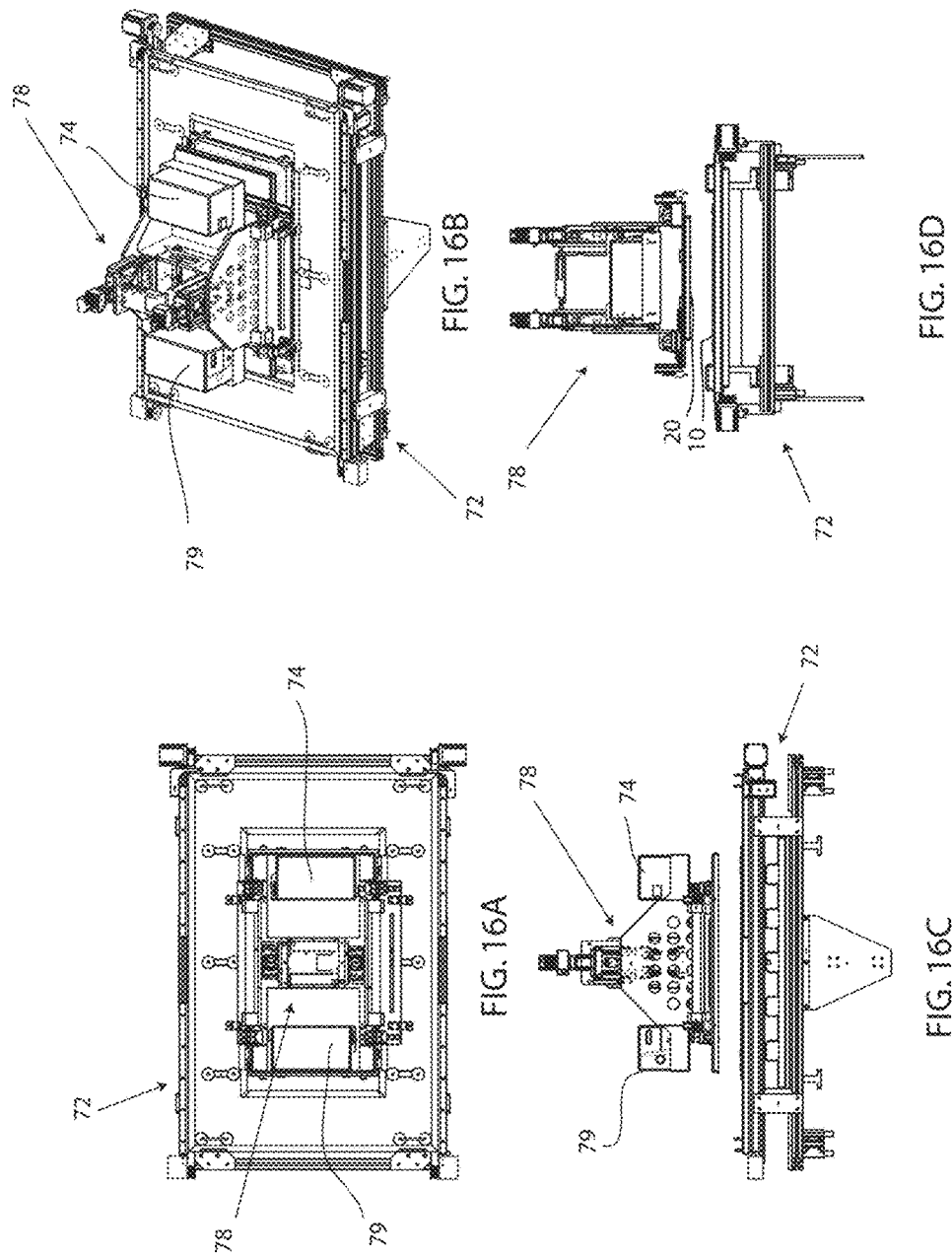

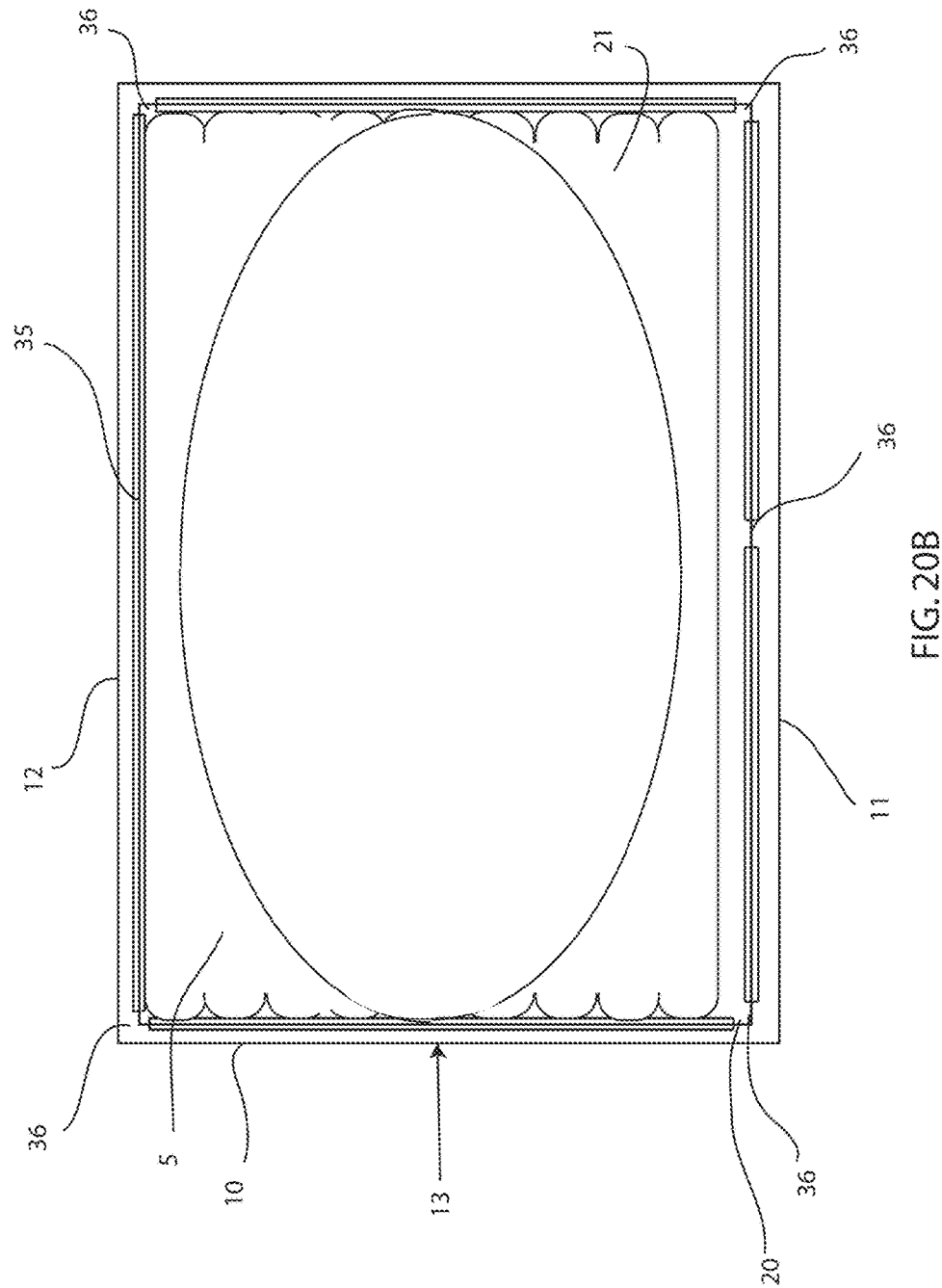

ROBOTIC PLACEMENT MACHINE FOR OPTICAL BONDING, SYSTEM AND METHOD OF USE THEREOF

CROSS-REFERENCE TO RELATED APPLICATIONS

This application is a divisional application that claims the benefit of and priority to U.S. Application Ser. No. 13/009,385, filed Jan. 19, 2011, and entitled, "Robotic Placement Machine for Optical Bonding, System and Method of Use Thereof."

FIELD OF TECHNOLOGY

The following relates to optical bonding of substrates and more specifically to embodiments of a machine, system, and method of automated optical bonding of substrates.

BACKGROUND

Optical bonding of a transparent substrate, such as a sheet of glass, to another transparent substrate, or to a video screen such as an electronic display, may improve the ruggedness and enhance the optical clarity in ambient light. Bonding transparent substrates to each other presents many difficulties, including maintaining the structural integrity of the bonded substrates and manipulating the fill material used to bond the substrates. Specifically, air pockets may form in the fill material between the two substrates during the placement and bonding process. One cause of air pockets is attributed to the placement of a glass sheet onto another sheet of glass. Another cause is the inability to manipulate and work with the fill materials used in the optical bonding processes. The presence of air pockets between the bonded substrates results in cracks at locations where air pockets are present.

Accordingly, a need exists for an optical bonding machine, system, and method that address the difficulties in the art.

SUMMARY

A first general aspect relates to a robotic placement machine configured to attach to a Y-axis actuator for moving left and right along an Y-axis and a X-axis actuator for moving back and forth along an X-axis, the robotic placement machine comprising a base operably connectable to at least one of the Y-axis actuator and the X-axis actuator, the base having a first end and a second end, a first Z axis actuator coupled to the first end of the base, the first Z axis actuator capable of moving up and down a first Z axis, a second Z axis actuator coupled to the second end of the base, the second Z axis actuator capable of moving up and down a second Z axis, and a pick and place plate operably connected to the first Z axis actuator and the second Z axis actuator, wherein the first Z axis actuator and the second Z axis actuator are each capable of moving independently of each other to tilt the pick and place plate.

A second general aspect relates to system comprising a first machine, wherein the first machine includes a valve coupled to a first end effector, the valve applying a material around a perimeter of a first substrate to form a dam, a second machine, wherein the second machine includes a custom head coupled to a second end effector, the custom head dispensing a fill material across a surface of the first substrate, wherein the dispensed fill material has a variable fill height, and a third machine, wherein the third machine includes a third end effector, the third end effector configured to pick a second substrate and controllably lower the second substrate onto the first substrate, wherein each of the first machine, second machine, and third machine are operably connected.

A third general aspect relates to an optical bonding method comprising dispensing dam material around a perimeter of the first substrate to form a dam, dispensing a fill material across a surface of the first substrate to achieve a largest fill height proximate a rear edge of the first substrate and a lowest fill height proximate a front edge of the first substrate, placing a second substrate into contact with the fill material proximate the rear edge of the first substrate at an angle relative to the first substrate, and controllably lowering the second substrate onto the first substrate until the second substrate is bonded to the first substrate to prevent and eliminate air bubbles between the first and second substrates.

A fourth general aspect relates to an optical bonding method comprising dispensing dam material around a perimeter of the first substrate to form a dam, dispensing a fill material across a surface of the first substrate to achieve a largest fill height proximate a middle portion of the first substrate, placing a second substrate into contact with the fill material proximate the middle portion of the first substrate, and controllably lowering the second substrate onto the first substrate substantially parallel to the first substrate until the second substrate is bonded to the first substrate to prevent and eliminate air bubbles between the first and second substrates.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein:

FIG. 6B depicts a top view of an embodiment of the first end effector;

FIG. 6C depicts a side view of an embodiment of the first end effector;

FIG. 7 depicts a top view of an embodiment of a first substrate having a dam;

FIG. 13B depicts a cross-section view of a second embodiment of the first substrate after fill material has been dispensed across its surface;

FIG. 16A depicts a top view of an embodiment of the third end effector a distance above an underside assembly;

FIG. 16B depicts a perspective view of an embodiment of the third end effector a distance above an underside assembly;

FIG. 16C depicts a front view of an embodiment of the third end effector a distance above an underside assembly;

FIG. 16D depicts a side view of an embodiment of the third end effector a distance above an underside assembly;

FIG. 20B depicts a top view of a second embodiment of a second substrate lowering onto the first substrate causing a capillary effect on the fill material;

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
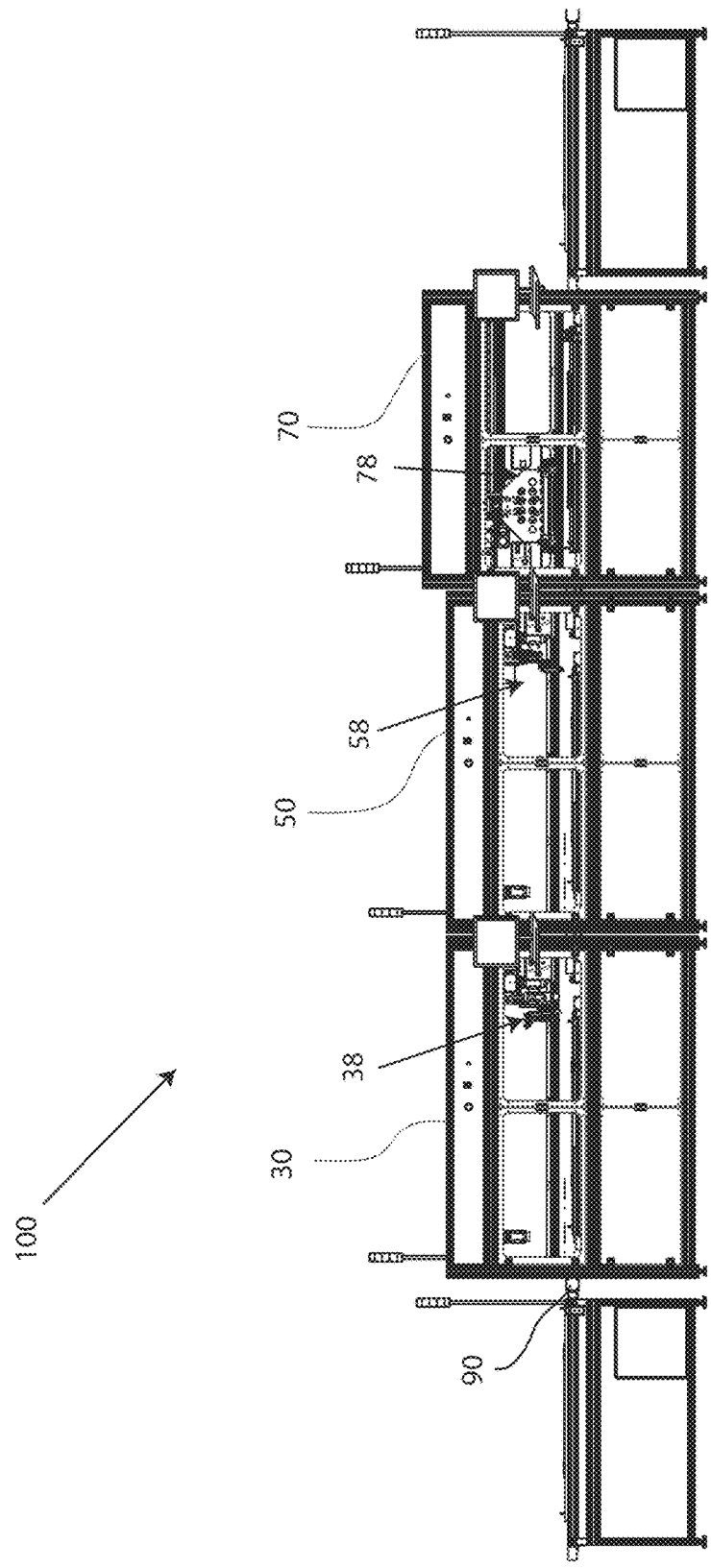
FIG. 1 depicts a front view of an embodiment of a system having an embodiment of a first system, second system, and a third system.
Figure 3A:
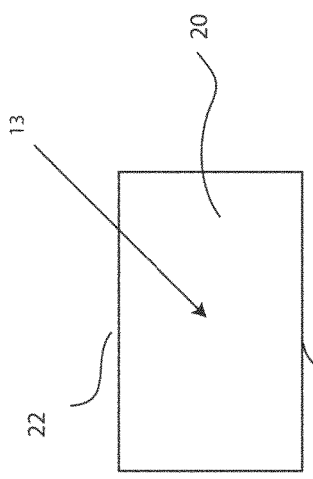
FIG. 3A depicts a top view of an embodiment of a second substrate.
Figure 3B:
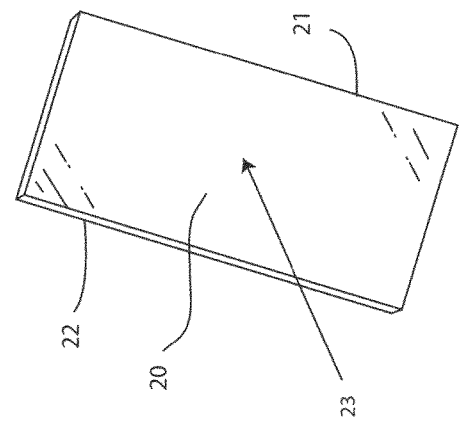
FIG. 3B depicts a perspective view of the second substrate.
Figure 2A:
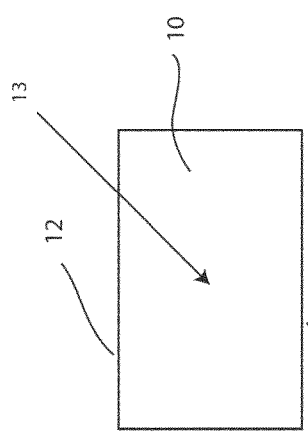
FIG. 2A depicts a top view of an embodiment of a first substrate.
Figure 2B:
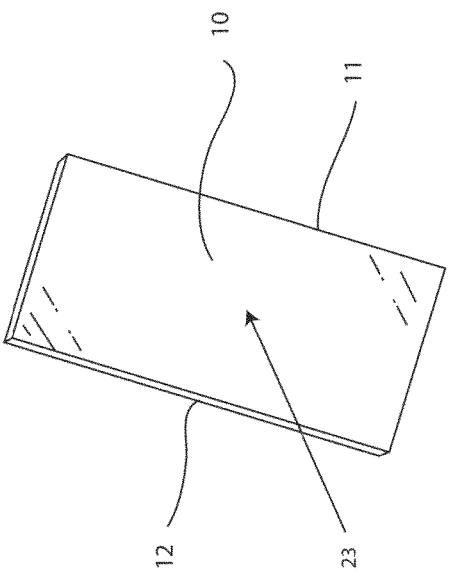
FIG. 2B depicts a perspective view of an embodiment of the first substrate.

Referring to the drawings, FIG. 1 depicts an embodiment of system 100. System 100 may be an optical bonding system, liquid bonding system, liquid optical bonding system, glass lamination system, a system for bonding two transparent substrates together, and the like. System 100 may include a first machine 30, a second machine 50, a third machine 70, and a conveyor system 90 connecting the first machine 30, the second machine 50, and the third machine 70. Each machine 30, 50, 70 may perform one or more tasks to accomplish the bonding of two substrates. However, embodiments of system 100 may include less than three machines and may include more than three machines depending on the number of tasks to be performed by each machine. System 100 also includes a first substrate 10 and a second substrate 20, wherein the second substrate 20 is bonded to the first substrate 10. The first substrate 10 has a front edge 11 (first end), a middle portion 13, and a rear edge 12 (second end), as shown in FIGS. 2A and 2B. The second substrate 20 has a front edge 21 (first end), a middle portion 23, and a rear edge 22 (second end), as shown in FIGS. 3A and 3B. The first and second substrates 10, 20 may be transparent substrates. Embodiments of the first and second substrates 10, 20 may be sheets of glass of varying size (e.g. small and large), plastic, and the like. Further embodiments of the second substrate 20 may be a protective, transparent sheet of glass to be placed onto the first substrate 10, for example, the first substrate 10 may be a glass display of an electronic device, such as a cell phone screen/cover or flat screen television screen. The first and second substrates 10, 20 may also be opaque or other than transparent, or one of the first and second substrates 10, 20 may be transparent while the other is opaque or other than transparent. The first and second substrates 10, 20 are bonded together with a fill material 5. Fill material 5 may be an optically clear adhesive, such as DuPont® Vertak family of adhesives, or any clear adhesive that may quickly cure under UV and efficiently adhere to glass and similar surfaces.

Figure 4:
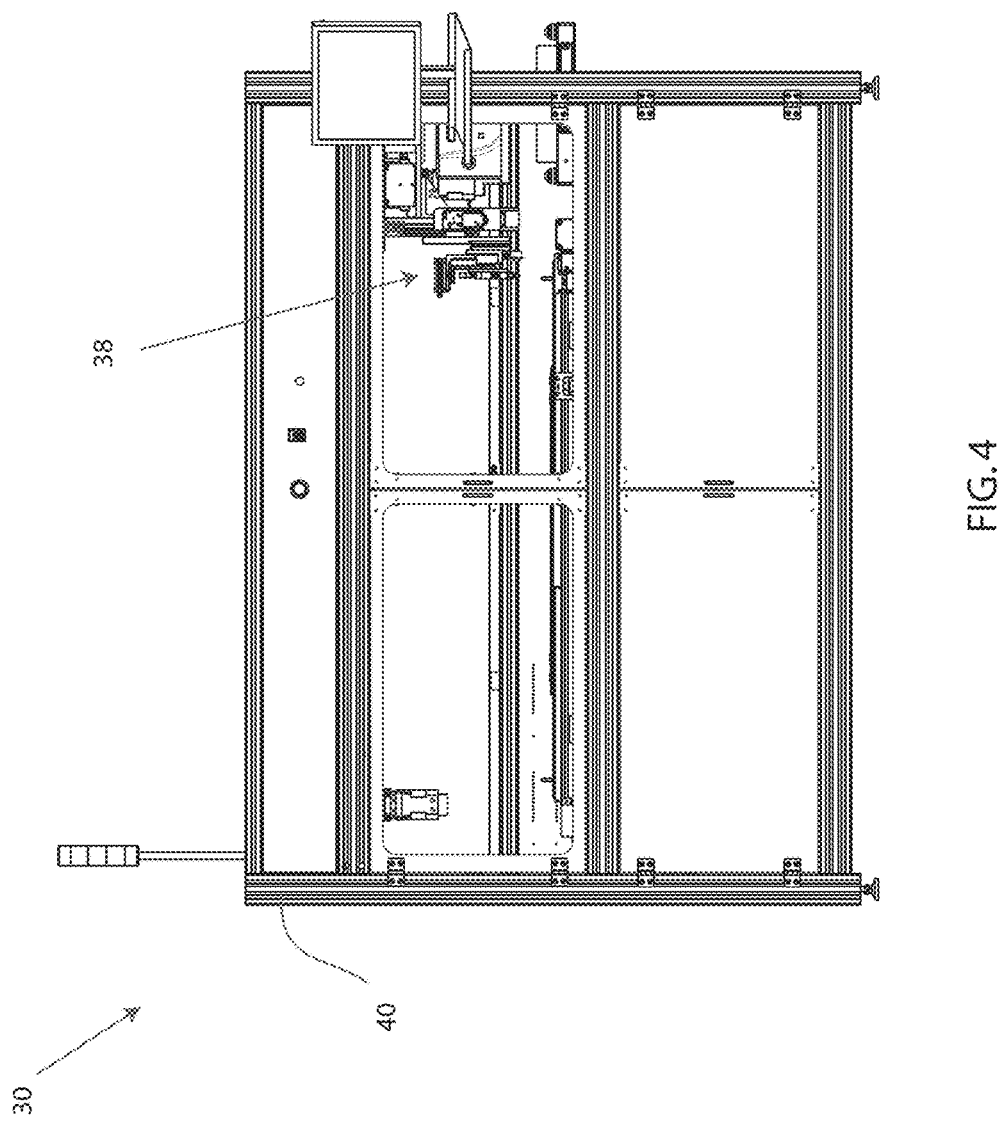
FIG. 4 depicts a front view of an embodiment of the first machine.
Figure 5:
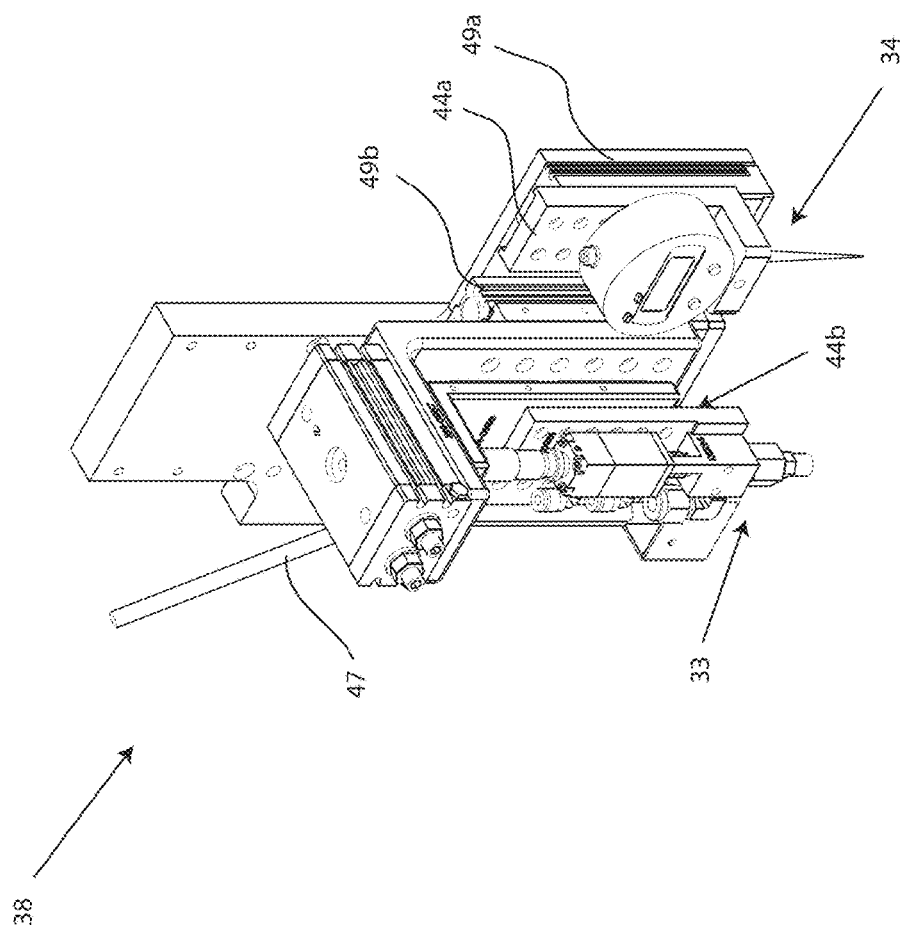
FIG. 5 depicts a perspective view of an embodiment of a first end effector.
Figure 6A:
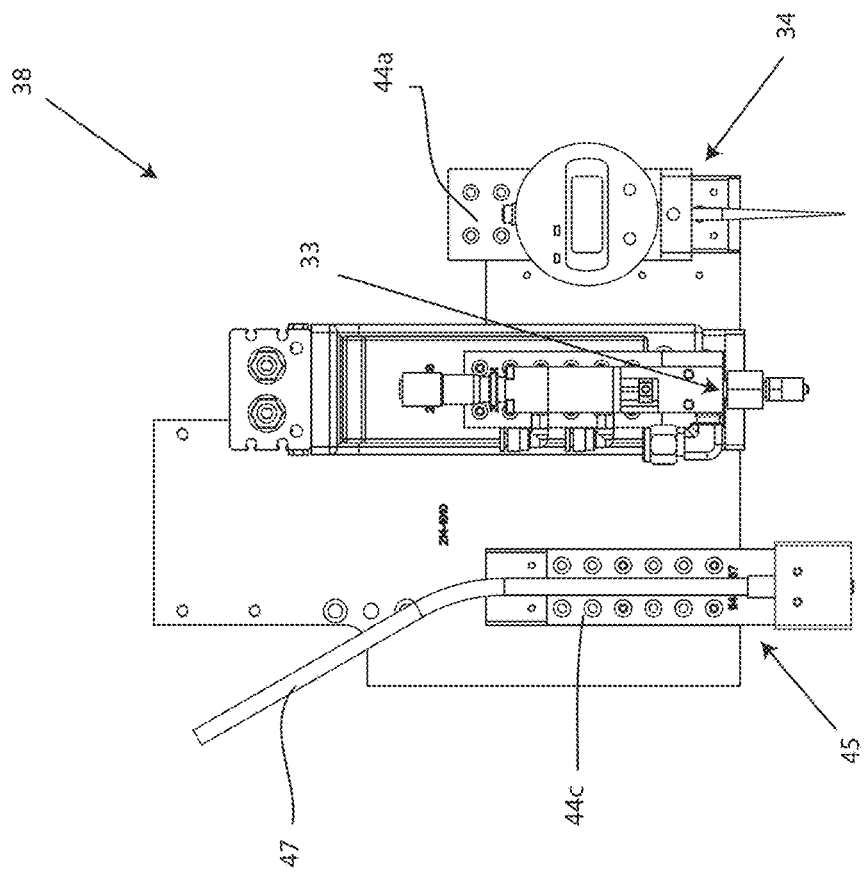
FIG. 6A depicts a front view of an embodiment of the first end effector.

Referring now to FIG. 4, embodiments of a first machine 30 of system 100 may include a frame 40, an X-axis actuator, a Y-axis actuator, a Z-axis actuator, and a first end effector 38. The first machine 30 may utilize a robotic platform to perform automated tasks with accuracy, precision, and repeatability. For example, the first machine 30 may be a Gantry robot having three principal axes (Cartesian coordinates) controlling linear motion, wherein the horizontal member(s) may be supported at both ends. The first machine 30 may also be any robotic manipulator such as a selective compliant assembly robot arm (SCARA) system, linear robot, multi-axis robot arm system, and the like. However, an embodiment of the first machine 30 will now be described as utilizing a Gantry robot for exemplary purposes. The first end effector 38 may refer to any device(s) attached to a X, Y, Z or other axis of movement to perform a variety of tasks, such as dispensing, picking and placing, routing, and the like. For instance, the first end effector 38 is capable of rotation about the Z axis, and may move left and right along the Y axis by sliding along the Y axis actuator, and move back and forth along the X axis by sliding with the Y axis actuator as it slides along the X axis actuator. Additionally, the first end effector 38 may move up and down on the Z-axis by sliding along the Z-axis actuator. The X-axis actuator, the Y-axis actuator, and the Z-axis actuator may be a ball screw slide, linear motion slide, a linear actuator, and the like. Moreover, the frame 40 may provide a structure surrounding the components of the first machine 30. The frame 40 may allow for panels to be attached providing an enclosure for the first machine 30. The panels attached to the frame 40 may be a combination of both solid panels and see-through panels, such as Plexiglas®, glass, plastic, and the like, to allow viewing of the operation of the first machine 30.

FIGS. 4-6C depict an embodiment of a first machine 30 including at least one vacuum plate 31 coupled to an underside 32, a first end effector 38, a height sensor 34 coupled to the first end effector, at least one valve 33 coupled to the first end effector 38, a UV wand 45 coupled to the first end effector 38, a light source proximate the first end effector 38, a vision system 39, and a conveyor system 90 for moving the first substrate 10 to and from the first machine 30. As the first substrate 10 enters the first machine 30 on conveyor system 90, a vacuum plate coupled to an underside, or support substrate, may be raised up to the first substrate 10. Alternatively, the first substrate 10 may be lowered to the vacuum plate coupled to the underside. Other methods known to those skilled in the art may be used to place the first substrate 10 into physical contact with the vacuum plate of the first machine 30. When the first substrate 10 is positioned above the vacuum plate, the vacuum plate may secure the first substrate 10 in a flat position and prevent translational movement, sliding, shifting, etc., of the first substrate 10. The underside of the first machine 30 may include one or more vacuum plates, depending on the size of the first substrate 10. Once the first substrate 10 is held in place by the vacuum plate, a height sensor 34 coupled to the first end effector 38 may engage the first substrate 10 to probe the surface of the first substrate 10, such as a target fill area and the perimeter of the first substrate 10. The height sensor 34 may probe the surface height of the first substrate 10 to detect warpage or other deformities in the surface of the first substrate 10. In one embodiment, the height sensor 34 may be a contact/touch probe relying on physical interaction between a probe arm and the surface of the first substrate 10. In another embodiment, the height sensor 34 may be a laser probe which avoids physically contacting the surface of the first substrate 10.

The height sensor 34 may be connected to a mounting plate 44a, wherein the mounting plate 44a is connected to an independent Z actuator 49a, such as a ball screw slide, to allow for movement up and down along a Z axis. The independent Z actuator 49a may be connected to the general structure of the first end effector 38. Thus, the height sensor 34 may be able to move up and down independent of the first end effector 38 through actuation of the independent Z actuator 49a associated with the height sensor 34. A mounting plate, such as mounting plates 44a, 44b, may be any component(s), rigid or otherwise, that may be used to connect, secure, attach, etc., a component of the first machine 30 to the first end effector 38. Likewise, embodiments of a first machine 30 may include at least one valve 33 coupled to the first end effector 38. The first valve 33 (and/or valve assembly) may be connected directly or indirectly to a mounting plate 44b, wherein the mounting plate 44b is connected to an independent Z actuator 49b, such as a ball screw slide, to allow for movement up and down along a Z axis. The independent Z actuator 49b may be connected to the general structure of the first end effector 38. Thus, the valve 33 may be able to move up and down independent of the first end effector 38 through actuation of the independent Z actuator 49b associated with valve 33.

Referring still to FIGS. 4-6C, at least one valve 33 may be coupled to the first end effector 38 to create a dam 35 along a perimeter of the first substrate 10. In other words, the dam 35 may be applied along a perimeter of a predefined area where fill material 5 may be dispensed from a custom head 53 of the second machine 50, as shown in FIG. 7. The dam 35 may extend to the edges of the first substrate 10 or may be a distance from the edges of the first substrate 10. The valve 33 may be a single dispensing valve. Moreover, movement of the first end effector 38 along the perimeter of the first substrate 10 while valve 33 is coupled to the first end effector 38 allows valve 33 to dispense an amount of dam material necessary to create a dam 35 according to the required/desired properties and specifications. Dam 35 material may include UV (ultraviolet) cure adhesive or material. The dam 35 may act as a spacer between the first substrate 10 and the second substrate 20 when the first and second substrates 10, 20 are bonded together. Thus, the height, girth, curvature, etc. of the dam 35 may vary according to the space desired/required between the first and the second substrates 10, 20 when bonded. Embodiments of dam 35 include a height ranging from 0.1 mm and 0.7 mm high, and a width ranging from 0.2 mm to 0.5 mm. The dam 35 may be applied as a bead along the perimeter of the first substrate 10 or may be applied flat along the perimeter of the first substrate 10, depending on the desired/required properties and specifications. Additionally, the dam 35 may act as a retainer, barrier, wall, boundary, and the like, for the fill material 5 dispensed on the surface of the first substrate 10 in the second machine 50. The dam 35 may also include vents 36 to allow air to escape during the placement of the second substrate 20 onto the first substrate 10. In addition, excess fill material 5 may also escape through vents 36 during some applications. Vents 36 may be a gap, break in the dam 35, aperture, slot, hole, opening, and the like. The number and placement of vents 36 may vary according to required/desired specifications. In one embodiment, vents 36 may be placed at the two corners and at the middle of the dam 35 adjacent to the front edge 11 of the first substrate 10. In another embodiment, a single vent 36 may be placed at some point between the corners of the dam 35 adjacent to the front edge 11. Other embodiments include a combination of vents 36 at the corners of the dam 35 and at points between the corners of the dam 35. Vents 36 may also be located on the dam 35 adjacent to the sides of the first substrate 10 to assist the escape of air and excess fill material 5 if the flow of fill material 5 is irregular during placement of the second substrate 20.

Embodiments of the first machine 30 may also include a light source in communication with an ultraviolet (UV) wand 45 coupled to the first end effector 38. The UV wand 45 may be connected, directly or indirectly, to a mounting plate 44c, wherein the mounting plate 44c is connected to an independent Z actuator 49c, such as a ball screw slide, to allow for movement up and down along a Z axis. The independent Z actuator 49c may be connected to the general structure of the first end effector 38. Thus, the UV wand 45 may be able to move up and down independent of the first end effector 38 through actuation of the independent Z actuator 49c associated with UV wand 45. A mounting plate, such as mounting plates 44a, 44b, 44c may be any component(s), rigid or otherwise, that may be used to connect, secure, attach, etc., a component of system 100 to the first end effector 38. The UV wand may emit ultraviolet light to semi-cure, stabilize, seal, and/or freeze the dam 35 material after application to the surface of the first substrate 10. The dam 35 material may slump or otherwise need to be stabilized after application; therefore, movement of the first end effector 38 along the perimeter of the first substrate 10 (i.e. along the dam 35) while the UV wand 45 is coupled to the first end effector 38 allows the UV wand to emit UV light to stabilize the dam 35 material. The emitted/transmitted light from the UV wand 45 may come from a light source, wherein the UV wand 45 is in communication with and/or connected to the light source with a guide cable 47. Guide cable 47 may connect the UV wand 45 coupled to the first end effector 38 to a light source that may be proximate the first end effector 38. The light source may be a source of ultraviolet radiation. Embodiments of first machine 30 include a light source suspended from the frame 40 or other structural component of the first machine 30 proximate the first end effector 38. Other embodiments include a light source external to the first machine 30, wherein the guide cable 47 connects the UV wand 45 to the external light source. Even further embodiments include a light source coupled directly to the first end effector 38. Those skilled in the art should appreciate that the guide cable 47 may be a liquid filled cable, fiber optic cable, or similar cables associated with UV wands and UV light sources.

Further embodiments of the first machine 30 of system 100 may include a vision system 39 coupled to the first end effector 38. The vision system 39 may be a camera or other suitable vision system capable of detecting the orientation, location, position, etc. of parts, such as the first substrate 10, within the first machine 30.

After one or more tasks associated with the first machine 30 are completed, the vacuum plate may release the first substrate 10, and then the first substrate 10 may be forwarded to the second machine 50 via conveyor system 90, such as a conveyor belt. Those skilled in the art should appreciate that the first substrate 10 may be manually loaded in and out of the first machine 30. Furthermore, it should be understood that each task/component associated with the first machine 30, including, inter alia, height sensor 34 detecting surface height of first substrate 10, valve 33 dispensing dam material to create a dam 35, UV wand 45 to stabilize the dam 35, vision system 39 to monitor orientation of components, may be performed in separate machines. For instance, the tasks/components associated with the first machine 30 may be performed in two or more machines, wherein the first substrate 10 is transferred to each machine accordingly.

Figure 8:
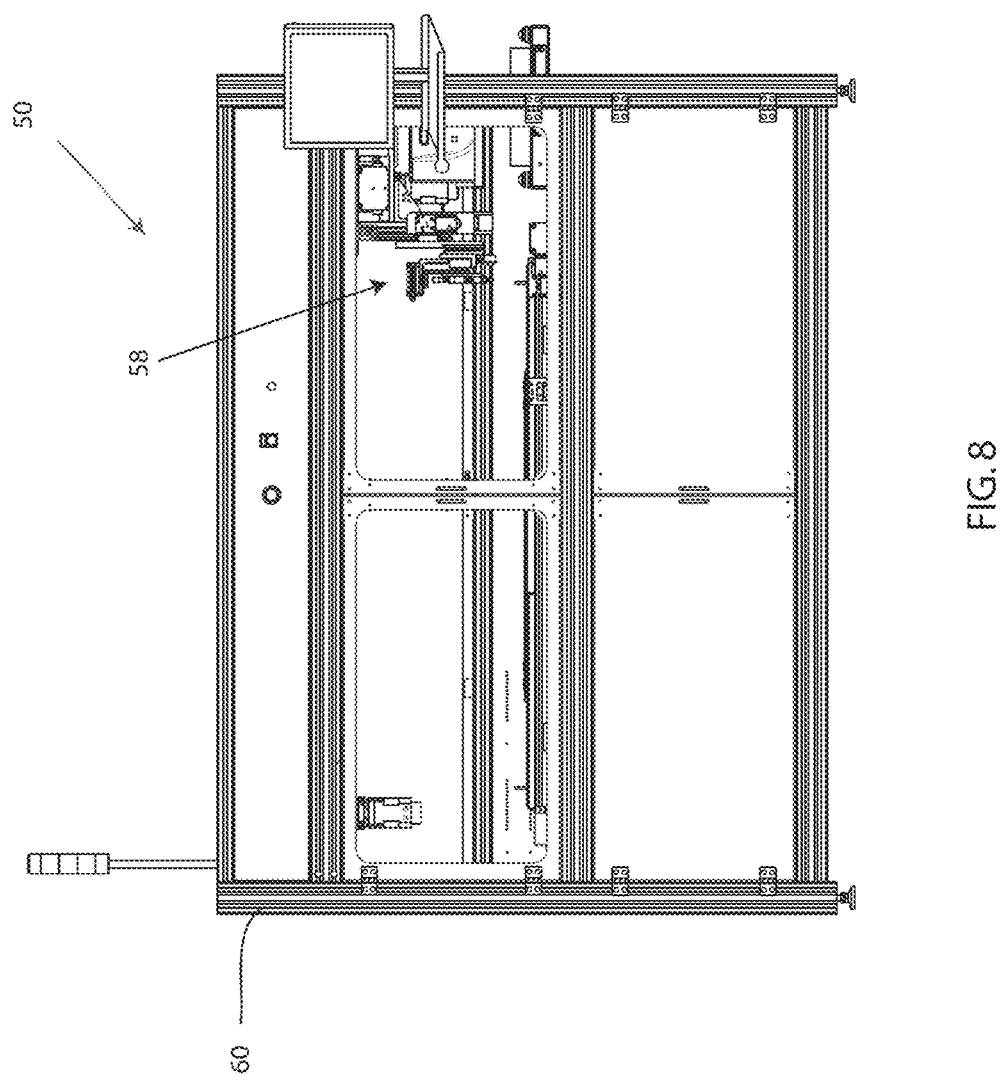
FIG. 8 depicts a front view of an embodiment of a second machine.

Referring now to FIG. 8, embodiments of a second machine 50 of system 100 may include a frame 60, an X-axis actuator, a Y-axis actuator, a Z-axis actuator, and a second end effector 58. The second machine 50 may utilize a robotic platform to perform automated tasks with accuracy, precision, and repeatability. For example, the second machine 50 may be a Gantry robot having three principal axes (Cartesian coordinates) controlling linear motion, wherein the horizontal member(s) may be supported at both ends. The second machine 50 may also be any robotic manipulator such as a selective compliant assembly robot arm (SCARA) system, linear robot, multi-axis robot arm system, and the like. However, an embodiment of the second machine 50 will now be described as utilizing a Gantry robot for exemplary purposes. The second end effector 58 may refer to any device(s) attached to a X, Y, Z or other axis of movement to perform a variety of tasks, such as dispensing, picking and placing, routing, and the like. For instance, the second end effector 58 is capable of rotation about the Z axis, and may move left and right along the Y axis by sliding along the Y axis actuator, and move back and forth along the X axis by sliding with the Y axis actuator as it slides along the X axis actuator. Additionally, the second end effector 58 may move up and down on the Z-axis by sliding along the Z-axis actuator. The X-axis actuator, the Y-axis actuator, and the Z-axis actuator may be a ball screw slide, linear motion slide, a linear actuator, and the like. Moreover, the frame 60 may provide a structure surrounding the components of the second machine 50. The frame 60 may allow for panels to be attached providing an enclosure for the second machine 50. The panels attached to the frame 60 may be a combination of both solid panels and see-through panels, such as Plexiglas®, glass, plastic, and the like, to allow viewing of the operation of the second machine 50.

Embodiments of the second machine 50 may include at least one vacuum plate coupled to an underside, or support frame, a second end effector 58, a treatment head 54 coupled to the second end effector 58, a custom head 53 coupled to the second end effector 54, a vision system 59, and a conveyor system 90 for moving the first substrate 10 to and from the second machine 50. As the first substrate 10 enters the second machine 50 on conveyor system 90, a vacuum plate coupled to an underside may be raised up to the first substrate 10. Alternatively, the first substrate 10 may be lowered to the vacuum plate coupled to the underside. Other methods known to those skilled in the art may be used to place the first substrate 10 into physical contact with the vacuum plate. When the first substrate 10 is positioned above the vacuum plate, the vacuum plate may secure the first substrate 10 in a flat position and prevent translational movement, sliding, shifting, etc., of the first substrate 10. The underside of the second machine 50 may include one or more vacuum plates, depending on the size of the first substrate 10.

Figure 9:
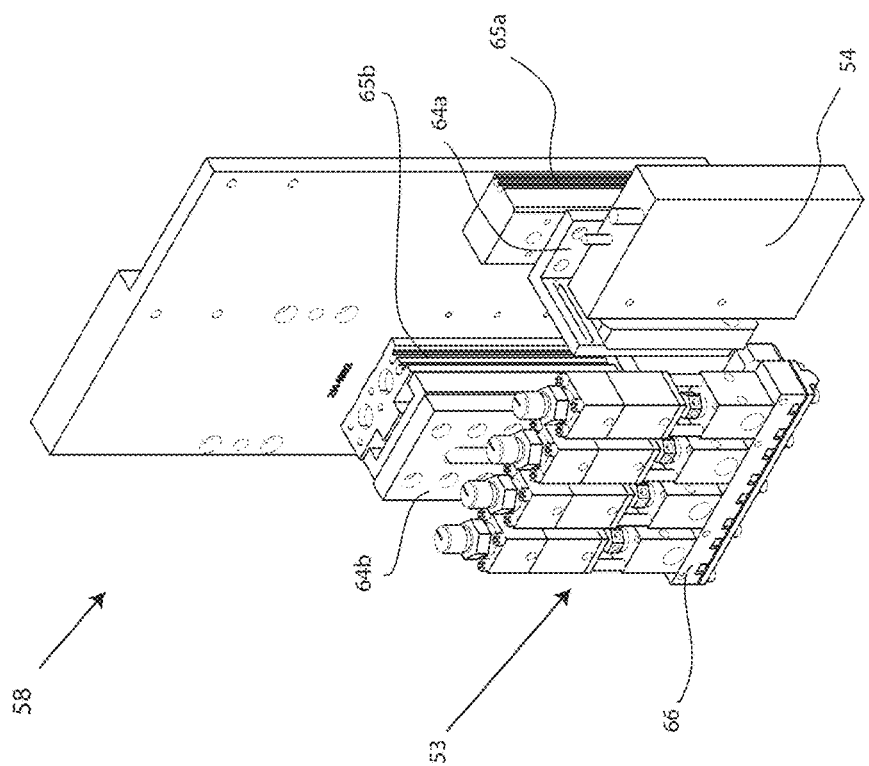
FIG. 9 depicts a perspective view of an embodiment of a second end effector.
Figure 10:
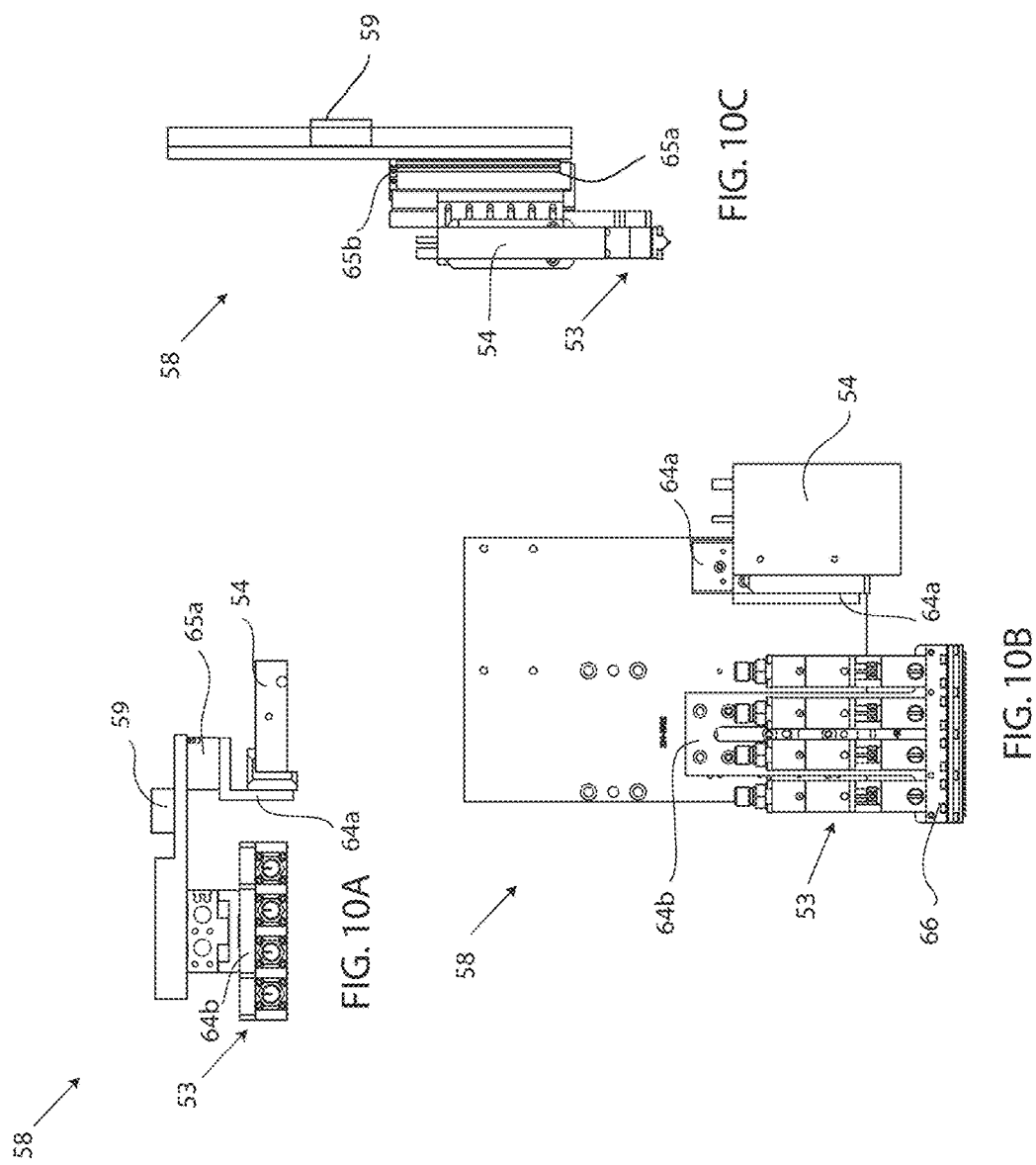
FIG. 10A depicts a top view of an embodiment of the second end effector.
FIG. 10B depicts a front view of an embodiment of the second end effector.
FIG. 10C depicts a side view of an embodiment of the second end effector.

With continued reference to FIG. 8, and additional reference to FIGS. 9-10C, the first substrate 10 is held in place by the vacuum plate, a treatment head 54 coupled to the second end effector 58 may treat the surface of the first substrate 10. In most embodiments, the treatment head 54 treats only the target fill area, wherein the target fill area may be defined as the surface area inside/within the dam 35, or the majority of the surface area of the first substrate 10. Treating the surface of the first substrate 10 may require plasma treatment of the surface of the first substrate 10 to change the surface energy of the first substrate 10 to improve wetting and adhesion properties of the surface of the first substrate 10. The treatment head 54 may be referred to as a plasma head or surface treatment head. Moreover, movement of the second end effector 58 back and forth across the target area may treat the surface of the first substrate with the treatment head 54 coupled to the second end effector 58. The treatment head 54 may be up to 4 inches wide. Moreover, the treatment head 54 may be connected to a mounting plate 64a, wherein the mounting plate 64a is connected to an independent Z actuator 65a, such as a ball screw slide, to allow for movement up and down along a Z axis. The independent Z actuator 65a may be connected to the general structure of the second end effector 58. Thus, the treatment head 54 may be able to move up and down independent of the second end effector 58 through actuation of the independent Z actuator 65a associated with the treatment head 54. A mounting plate, such as mounting plates 64a, 64b, may be any component(s), rigid or otherwise, that may be used to connect, secure, attach, etc., a component of second machine 50 to the second end effector 58. Likewise, embodiments of a second machine 50 may include a custom head 53 coupled to the second end effector 58. The custom head 53 (and/or valve(s) assembly) may be connected directly or indirectly to a mounting plate 64b, wherein the mounting plate 64b is connected to an independent Z actuator 65b, such as a ball screw slide, to allow for movement up and down along a Z axis. The independent Z actuator 65b may be connected to the general structure of the second end effector 58. Thus, the custom head 53 may be able to move up and down independent of the second end effector 58 through actuation of the independent Z actuator 65b associated with the custom head 53. A fluid reservoir may be operably attached to the custom head 53 through various means, such as a hose or other tube. The fluid reservoir may contain fill material 5, such as optically clear adhesive.

Furthermore, the custom head 53 may include a single dispensing valve or a plurality of dispensing valves for dispensing a fill material 5 onto the first substrate 10. The custom head 53 having a plurality of valves may speed up the fill process over a larger substrate due to a wider fill pattern, while a single dispensing valve may be helpful over smaller substrates due to a narrower fill pattern. Embodiments of the custom head 53 may include four, one inch-wide dispensing valves positioned in a side-by-side configuration, wherein each valve of the plurality of valves is level or substantially level with respect to the other valves forming the custom head 53. Those skilled in the art should appreciate that the configuration and placement of the valves of the custom head 53 may include other configurations and placement locations, but may typically remain proximate each other coupled to the second end effector 58. Further embodiments of custom head 53 may include an outlet block 66 positioned at the nozzle end of the dispensing valves to help generate the dispense pattern through each pass across the first substrate 10. Moreover, the second machine 50 may selectively operate the custom head 53 such that only one or more of the plurality of valves forming the custom head 53 dispense fill material 5, while the other valves remain unused. The selective operation of the custom head 53 (e.g. 2 of 4 valves dispensing fill material 5) may be performed prior to operation of the second machine 50 and/or during the operation of the second machine 50. For instance, an embodiment of a custom head 53 having four or more dispensing valves may operate only three of the four or more valves of the custom head 53, without the need for disassembly, and without the need to stop the functioning/operation of the second machine 50. Because the second machine 50 can selectively operate individual components of the custom head 53, the fill pattern may be narrowed or widened depending on the requirement/specification of the first substrate 10 (e.g. size, fill area, time, etc).

Figure 11:
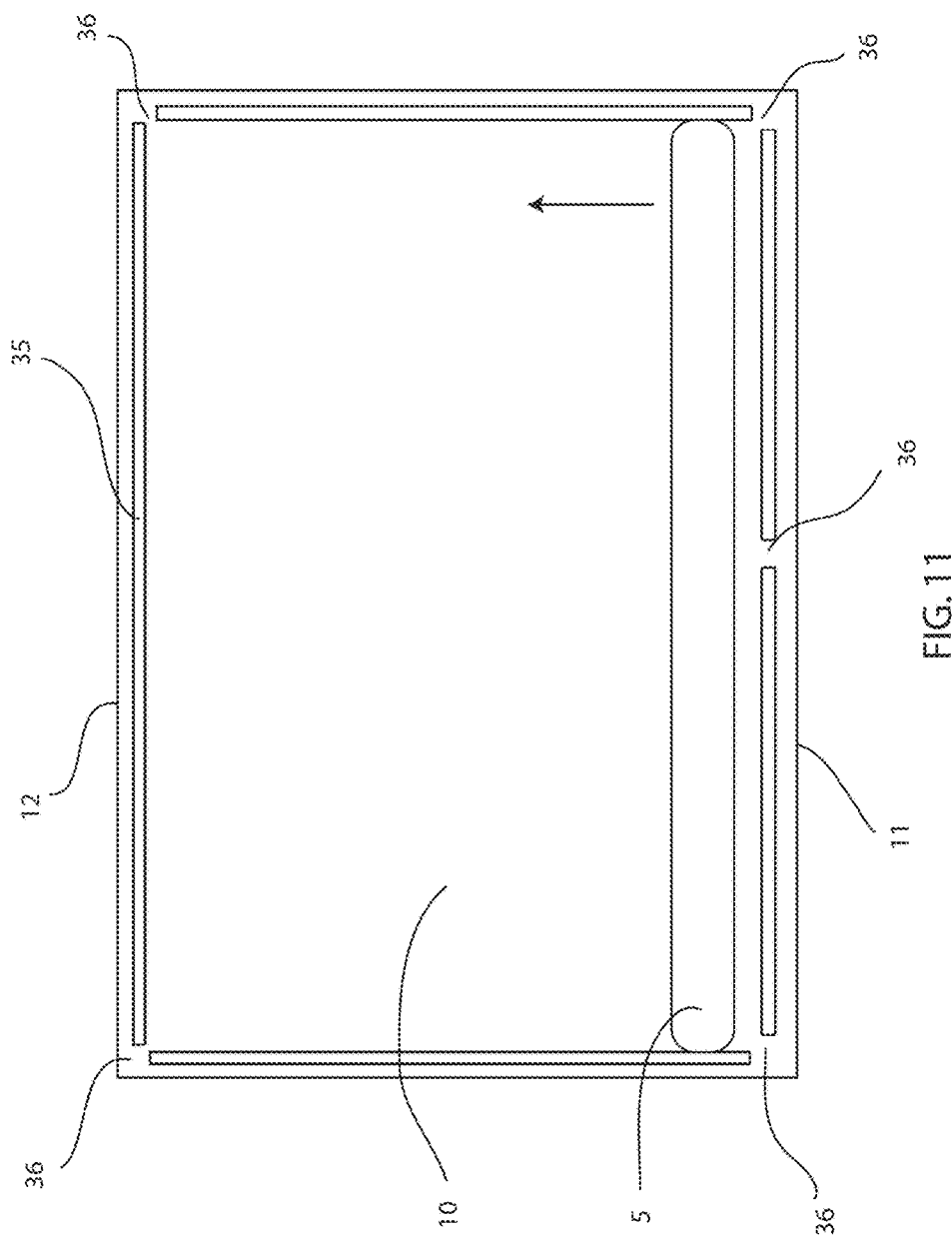
FIG. 11 depicts a top view of an embodiment of the first substrate having some fill material dispensed within the dam.
Figure 12:
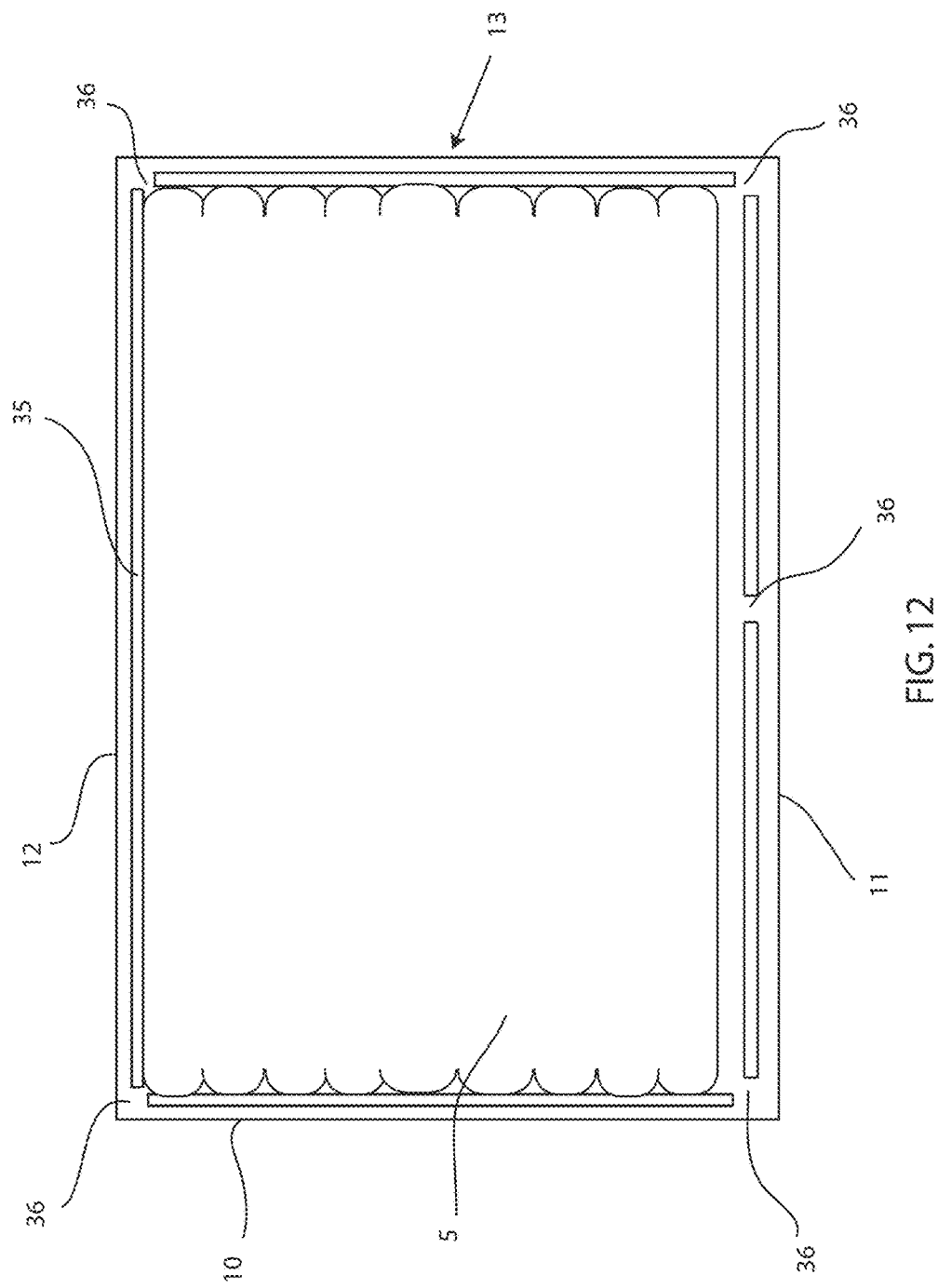
FIG. 12 depicts a top view of an embodiment of the first substrate after fill material has been dispensed across its surface.

Furthermore, movement of the second end effector 58 following a fill pattern across the first substrate 10 may dispense the fill material 5 across the fill area of the first substrate 10. The fill pattern of the fill material 5 may start proximate the front edge 11 of the first substrate 10, as shown in FIG. 11. The fill material 5 dispensed by the custom head 53 may start a distance from the dam 35 proximate or otherwise near the front edge 11, and a distance from the sides of the first substrate 10. The direction of the fill pattern may be from the front edge 11 to the rear edge 12 of the first substrate 10, and generally, the surface of the fill material 5 on the first substrate 10 should not contain waves, divots, or other surface irregularities (i.e. the surface of the fill material 5 may be smooth and continuous). Additionally, the movement of the second end effector 58 may be to dispense a rectangular and/or linear pattern from one side to the other side, wherein one trip by the second end effector 58 from side to side may be referred to as a pass. After a pass by the second end effector 58, the second end effector 58 may move a distance towards the rear edge 12, and make a pass back across (e.g. laterally) the first substrate 10. The patterned movement of the second end effector 58 may continue until reaching the dam 35 proximate the rear edge 12. Those having skill in the requisite art should appreciate that the second end effector 58 may follow various patterns and movements to apply the fill material 5. Accordingly, the fill material 5 may cover a large majority of the surface of the first substrate 10. For example, the fill material 5 may cover 85% to 95% of the first substrate 10, as shown in FIG. 12. Each pass of the second end effector 58 may dispense fill material 5 across (e.g. side-to-side) the first substrate 10, between the dam 35 or general target area in embodiments where no dam 35 is formed, at a width corresponding to the number of operating valves and type of dispensing valve of the custom head 53. Thus, the custom head 53 may determine the width of fill material 5 being dispensed each pass of the second end effector 58.

Figure 13A:
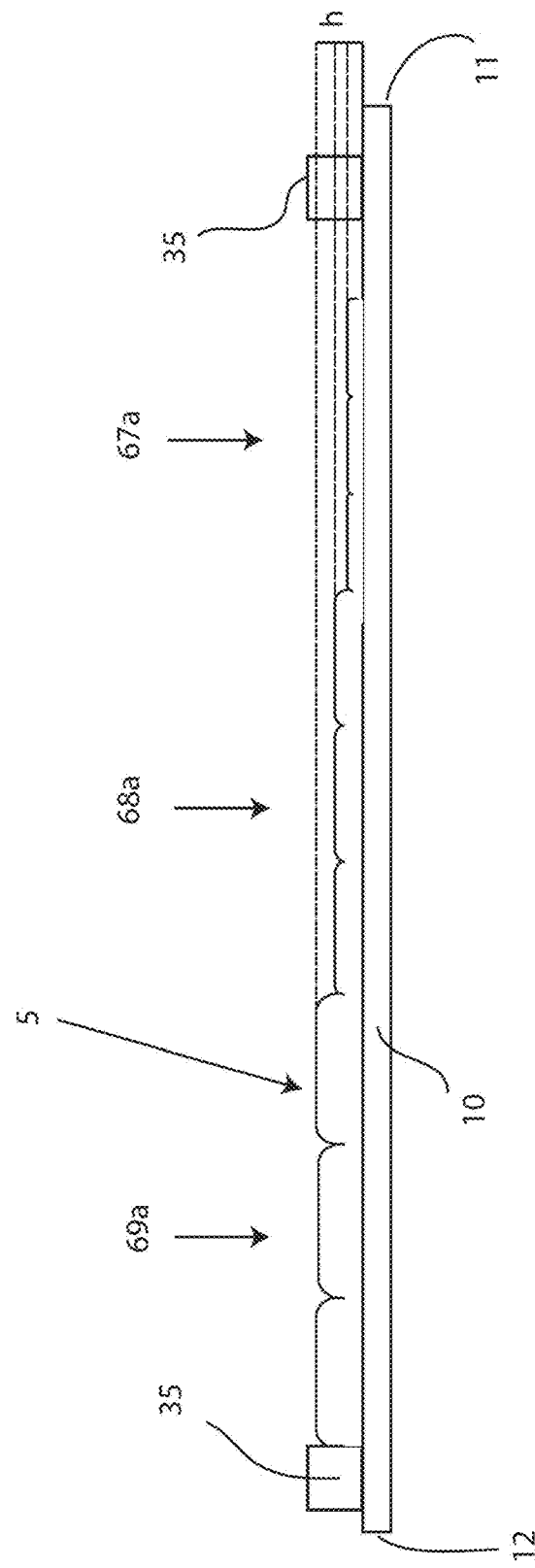
FIG. 13A depicts a cross-section view of a first embodiment of the first substrate after fill material has been dispensed across its surface.

Moreover, with reference to FIGS. 11-13A, the fill material 5 may be dispensed at a certain fill height, h. Fill height, h, may refer to the height of the fill material 5 from the surface of first substrate 10, once dispensed from the custom head 53. The fill height, h, may be controlled by the speed of the second end effector 58 during each pass across the first substrate 10. For example, the slower the second end effector 58 moves as it passes across the first substrate 10, the more fill material 5 may be dispensed at that location. The fill height, h, may also be controlled by the flow rates associated with the custom head 53 (e.g. size of the outlets, types of valves, etc.) and ultimately by the amount of fill material 5 dispensed from the custom head 53. In most embodiments, the fill material 5 is dispensed at a varying or variable fill height, h. In one embodiment, the variable fill height, h, may increase from the front edge 11 of the first substrate 10 to a rear edge 12 of the first substrate 10. In other words, the dispensed fill material 5 may have a largest fill height, h, proximate or otherwise near the rear edge 12 of the first substrate 10 and a lowest fill height, h, at the front edge 11 of the first substrate 10. Embodiments of the varying fill height, h, may require the second end effector 58 to make a first set of passes across the first substrate 10 at a consistent first fill speed, then a second set of passes across the first substrate 10 at a consistent second fill speed, and a third set of passes across the first substrate 10 at a consistent third fill speed, wherein the first set of passes begins proximate the front edge 11, the third set of passes occurs proximate the rear edge 12, further wherein the first fill speed is faster than the second fill speed, and the third fill speed is the slowest fill speed. Further embodiments of the varying fill height, h, may include a plurality of fill zones 67a, 68a, 69a. A fill zone 67a, 68a, 69a may refer to a portion of the target fill area having a certain fill height, h, of fill material 5 depending on the fill rate of the custom head 53. Each fill zone 67a, 68a, 69a may have the same fill height, h. Alternatively, each fill zone 67a, 68a, 69a may have a fill height, h, which slightly increases in a direction toward the rear edge 12, as shown in FIG. 13A. Although only three fill zones 67a, 68a, 69a are shown, those skilled in the art should appreciate that there may be more or less than three fill zones 67a, 68a, 69a. Fill zone 67a, the fill zone closest to the front edge 11, should have the lowest fill height, h. Fill zone 68a should have a fill height, h, greater than the fill zone 67a, but less than fill zone 69a. Accordingly, fill zone 69a, or fill zone closes to the rear edge 12 should have the greatest fill height, h.

In another embodiment, with reference to FIG. 13B, the variable fill height, h, may be a constant height from the front edge 11 of the first substrate 10 to a middle portion 13 of the first substrate 10, and constant from the rear edge 12 to the middle portion 13, wherein the fill height, h, at the middle portion 13 is larger. In other words, the dispensed fill material 5 may have a largest fill height, h, proximate or otherwise near middle portion 13 of the first substrate 10 and a lowest fill height, h, proximate or otherwise near the front edge 11 and rear edge 12 of the first substrate 10. Embodiments of the varying fill height, h, may require the second end effector 58 to make a first set of passes across the first substrate 10 at a consistent first fill speed, then a second set of passes across the first substrate 10 at a consistent second fill speed, and a third set of passes across the first substrate 10 at a consistent third fill speed, wherein the first set of passes begins/occurs proximate or otherwise near the front edge 11, the second set of passes occurs proximate or otherwise near the middle portion 13, the third set of passes occurs proximate or otherwise near the rear edge 12, further wherein the first fill speed and the third fill speed is faster than the second fill speed. Further embodiments of the varying fill height, h, may include a plurality of fill zones 67b, 68b, 69b, as shown in FIG. 13B. A fill zone 67b, 68b, 69b may refer to a portion of the target fill area having a certain fill height, h, of fill material 5 depending on the fill rate of the custom head 53. Although only three fill zones 67b, 68b, 69b are shown, those skilled in the art should appreciate that there may be more or less than three fill zones 67b, 68b, 69b. Fill zone 67b, can be the fill zone closest to the front edge 11. Fill zone 68b can be the fill zone proximate a middle portion 13. Fill zone 69b can be the fill zone closest to the rear edge 12. The fill zone 68b should have a fill height, h, greater than the fill height, h, of fill zone 67b and fill zone 69b. Accordingly, a fill zone proximate or otherwise near the middle portion 13 of the first substrate 10, such as fill zone 68b, should have the greatest fill height, h.

Further embodiments of the second machine 50 of system 100 may include a vision system 59 coupled to the second end effector 58, and a heating system to heat the fill material 5. The vision system 59 may be a camera or other suitable vision system capable of detecting the orientation, location, position, etc. of parts, such as the first substrate 10, within the second machine 50. Moreover, the heating system may include a heated valve(s) coupled to the second end effector 58, a heated fluid hose through which the fill material 5 travels from the fluid reservoir, or a heated fluid reservoir. Heating the fill material 5 may help improve the wetting of the fill material 5 by lowering the viscosity. The temperature range for heating the fill material may be between 30° C. to 50° C.

After one or more tasks associated with the second machine 50 are completed, the vacuum plate may release the first substrate 10, and then the first substrate 10 may be forwarded to the third machine 70 via conveyor system 90, such as a conveyor belt. Those skilled in the art should appreciate that the first substrate 10 may be manually loaded in and out of the second machine 50. Furthermore, it should be understood that each task/component associated with the second machine 50, including, inter alia, treatment head 54 treating the surface of first substrate 10, custom head 53 dispensing fill material onto the first substrate 10, vision system 39 to monitor orientation of components, may be performed in separate machines. For instance, the tasks/components associated with the second machine 50 may be performed in two or more machines, wherein the first substrate 10 is transferred to each machine accordingly.

Figure 14:
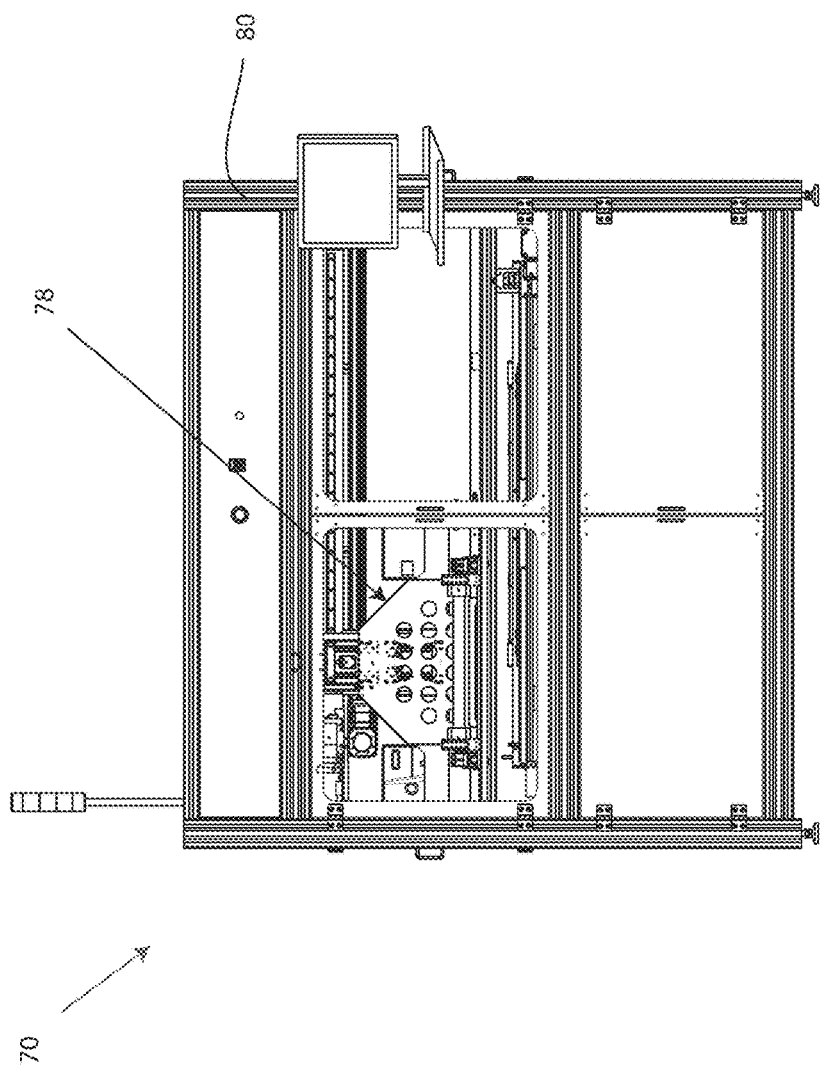
FIG. 14 depicts a front view of an embodiment of a third machine.
Figure 15:
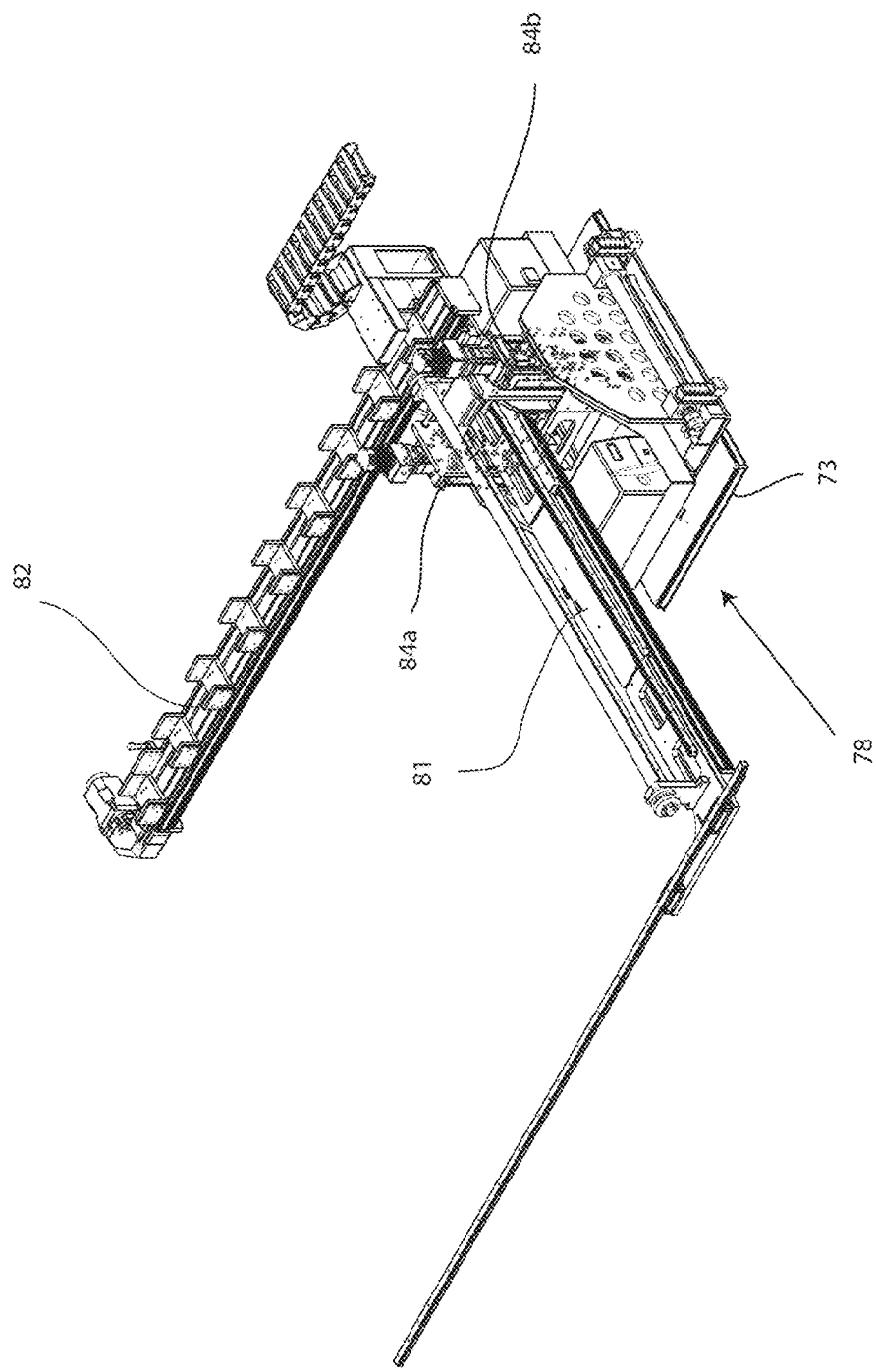
FIG. 15 depicts a perspective view of an embodiment of a third end effector.

Referring now to FIGS. 14 and 15, embodiments of a third machine 70 of system 100 may include a frame 80, an X axis actuator 81, a Y axis actuator 82, and a third end effector 78 having at least two independent Z actuators 84a, 84b. The third machine 70 may utilize a robotic platform to perform automated tasks with accuracy, precision, and repeatability. For example, the third machine 70 may be a Gantry robot having three principal axes (Cartesian coordinates) controlling linear motion, wherein the horizontal member(s) may be supported at both ends. The third machine 70 may also be any robotic manipulator such as a selective compliant assembly robot arm (SCARA) system, linear robot, multi-axis robot arm system, and the like. However, an embodiment of the third machine 70 will now be described as utilizing a Gantry robot for exemplary purposes. The third end effector 78 may refer to any device(s) attached to a X, Y, Z or other axis of movement to perform a variety of tasks, such as dispensing, picking and placing, routing, and the like. Embodiments of the third end effector 78 may be a robotic placement system/machine, as described infra. For instance, the third end effector 78 may move left and right along the Y axis by sliding along the Y axis actuator 82, and move back and forth along the X axis by sliding with the Y axis actuator 82 as it slides along the X axis actuator 81. Additionally, the third end effector 78 may move up and down on the Z axis by simultaneously actuating the first independent Z actuator 84a and the second independent Z actuator 84b. The X axis actuator 81, the Y axis actuator 82, and the first and second independent Z actuators 84a, 84b may be a ball screw slide, linear motion slide, a linear actuator, and the like. Moreover, the frame 80 may provide a structure surrounding the components of the third machine 70. The frame 80 may allow for panels to be attached providing an enclosure for the third machine 70. The panels attached to the frame 80 may be a combination of both solid panels and see-through panels, such as Plexiglas®, glass, plastic, and the like, to allow viewing of the operation of the third machine 70.

Embodiments of the third machine 70 may include at least one vacuum plate coupled to an underside assembly 72, or support assembly, a third end effector 78 including a height sensor 74 coupled to the third end effector 78, a pick and place plate 73 coupled to the third end effector 78, a vision system 59, and a conveyor system 90 for moving the first substrate 10 to the third machine 70, and for moving the bonded substrates to a cure oven, such as UV cure oven. As the first substrate 10 enters the third machine 70 on conveyor system 90, a vacuum plate coupled to an underside assembly 72 may be raised up to the first substrate 10. Alternatively, the first substrate 10 may be lowered to the vacuum plate coupled to the underside assembly 72. Other methods known to those skilled in the art may be used to place the first substrate 10 into physical contact with the vacuum plate. When the first substrate 10 is positioned above the vacuum plate, the vacuum plate may secure the first substrate 10 in a flat position and prevent translational movement, sliding, shifting, etc., of the first substrate 10. The underside assembly 72 of the third machine 70 may include one or more vacuum plates, depending on the size of the first substrate 10.

A second substrate 20 may enter system 100, in particular, the third machine 70 for optical bonding with the first substrate 10. The second substrate 20 may be manually loaded in a slide table proximate or otherwise near the third machine 70 to introduce the second substrate 20 into system 100. Alternatively, the loading of the second substrate 20 may be automated, such as a second conveyor system (e.g. conveyor belt). The location of the slide table for loading the second substrate 20 may correspond to the location of the pick and place plate 73 of the third end effector 78. For instance, the slide table may be positioned such that the second substrate 20 is loaded into the third machine 70 directly underneath or substantially underneath the pick and place plate 73 of the third end effector 78. In one embodiment, the slide table is positioned perpendicular to the third machine 70, wherein entry into the third machine 70 via slide table is proximate the third end effector 78. Once the second substrate 20 is loaded proximate the pick and place plate 73, the third end effector 78 may lower down to engage the second substrate 20 with the pick and place plate 73, wherein the pick and place plate 73 utilizes a vacuum force to secure (i.e. pick) the second substrate 20. Alternatively, the second substrate 20 may be raised to the pick and place plate 73; however, an automated or mechanical lift may be needed in addition to the manual loading, especially if the second substrate is a large sheet of glass. Accordingly, the third end effector 78 may be configured to pick the second substrate 20 via the pick and place plate 73, wherein the pick and place plate 73 is coupled to the third end effector 78.

Moreover, a height sensor 74 coupled to the third end effector 78 may be used to locate and monitor alignment the second substrate 20 as it enters the third machine 70. For example, the height sensor 74 may engage the second substrate 20 to locate and align the second substrate 20 with the pick and place plate 73. The height sensor 74 may probe the surface of the second substrate 20, and more specifically, the edges of the second substrate 20 to ensure proper engagement with the pick and place plate 73. Furthermore, the height sensor 74 may be used to probe the surface (to determine the height) of the first substrate 10 to locate the leading edge (i.e. rear edge 12) of the first substrate 10 and may determine the spatial location of the contact point between the second substrate 20 and the first substrate 10 (i.e. initial contact between the rear edge 12 of the first substrate 10 and the front edge 21 of the second substrate 20). Alternatively, the height sensor 74 may be used to probe the surface (to determine the height) of the first substrate 10 to locate at least one the rear edge 12 and the middle portion 13 of the first substrate 10 and may determine the spatial location of the contact point between the second substrate 20 and the first substrate 10 (i.e. initial contact between the middle portion 13 of the first substrate 10 and the middle portion 23 of the second substrate 20). In one embodiment, the height sensor 74 may be a contact/touch probe relying on physical interaction between a probe arm and the surface of the first substrate 10. In another embodiment, the height sensor 74 may be a laser probe which avoids physically contacting the surface of the first substrate 10.

Referring now to FIGS. 16A-19D, the third end effector 78 may be configured to pick and place a second substrate 20 onto the first substrate 10 and controllably lower the second substrate 20 onto the first substrate. As shown in FIG. 17D, the third end effector 78 may be configured to place a second substrate 20 onto the first substrate 10 at a placement angle, Ø, and controllably lower the second substrate 20 onto the first substrate 10, wherein an initial contact between the first and second substrate 10, 20 occurs proximate the rear edge 12 of the first substrate 10. As shown in FIG. 16D, the third end effector 78 may be configured to place the second substrate 10 onto the first substrate 10, wherein the second substrate 20 is parallel or substantially parallel to the first substrate 10 (i.e. controllably descend from position shown in FIG. 16D).

With reference to FIGS. 16A-16D, an embodiment of a third end effector 78 positioned a distance above an underside assembly 72 is shown. In this position, the third end effector 78 has picked the second substrate 10 and has moved into position proximate the first substrate 10, which may be secured to a vacuum plate. FIGS. 17A-17D show an embodiment of a third end effector 78 tilting to engage the first substrate 10 at an angle. Through simultaneous actuation of at least two independent Z axis actuators 84a, 84b, the third end effector 78 may move up and down along a Z axis to descend towards the first substrate 10 (or ascend away from the first substrate 10). Through independent actuation of at least two Z-axis actuators 84a, 84b, the third end effector 78 may be able to tilt to achieve the desired angle of placement in embodiments where the contact between the first substrate 10 and the second substrate 20 is not parallel. Because the pick and place plate 73 is coupled to the third end effector 78, the pick and place plate 73 may also tilt according to the movement of the third end effector 78. Likewise, because the second substrate 20 is secured to the pick and place plate 73, the second substrate 20 may also tilt according to the movements of the third end effector 78. Therefore, the initial contact between the first substrate 10 and the second substrate 20 may be proximate the rear edge 12 of the first substrate 10, at an angle of placement, Ø, between 0° and 20°. However, the angle of placement may be larger than 20° if required, and the capabilities of the two independent Z-axis actuators 84a, 84b may be adjusted accordingly.

Once the second substrate 20 has initially engaged the first substrate 10, the third end effector 78 may controllably lower the second substrate 20 onto the first substrate 10, as shown in FIGS. 18A-18D. For instance, from the initial point of contact, the second substrate 20 may be lowered at a calculated speed/velocity and angle. Controllably lowering the second substrate 20 onto the first substrate 10 may be gradual or proportional as the second substrate 20 is placed onto the first substrate 10. In other embodiments, controllably lowering the second substrate 20 onto the first substrate 10 may mean that the speed of placement may vary according to requirements/specifications of the substrates 10, 20 and/or fill material 5 being used. For example, as the angle between the second substrate 20 and the first substrate 10 decreases and nears zero degrees, the second substrate 20 may be controllably slowed to allow proper contact between the second substrate 20 and the first substrate 10, and to control flow of fill material 5. Generally, the speed of placement is slow to avoid disrupting the fill material 5 and inviting air bubbles to form between the substrates 10, 20 during the bonding process. Alternatively, controllably lowering the second substrate 20 onto the first substrate 10 may include a controlled descent of the third end effector 78 while the second substrate 20 is operably attached to the third end effector 78 at an angle parallel to the first substrate 10.

Figure 17B:
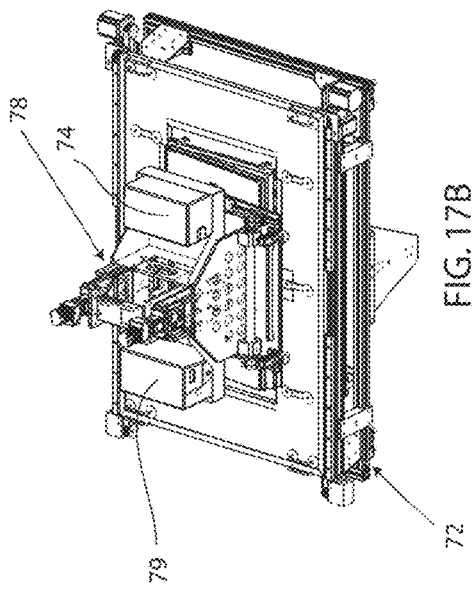
FIG. 17B depicts a perspective view of an embodiment of the third end effector at initial contact with the first substrate.
Figure 17D:
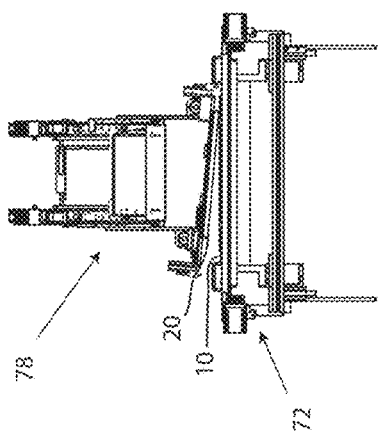
FIG. 17D depicts a side view of an embodiment of the third end effector at initial contact with the first substrate.
Figure 17A:
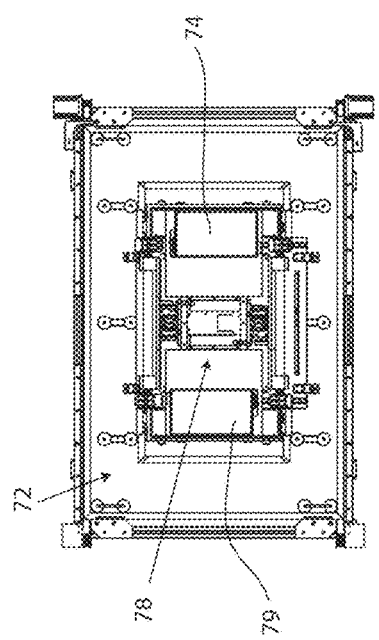
FIG. 17A depicts a top view of an embodiment of the third end effector at initial contact with the first substrate.
Figure 17C:
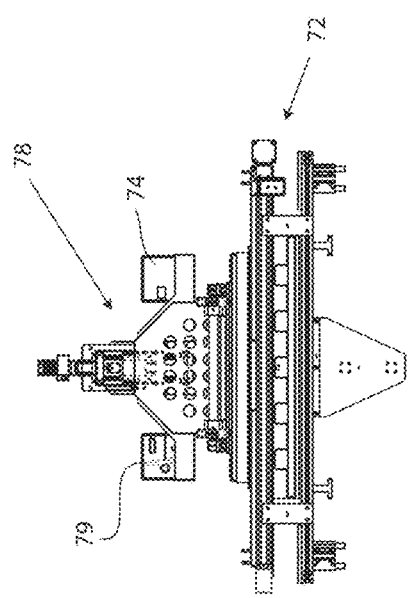
FIG. 17C depicts a front view of an embodiment of the third end effector at initial contact with the first substrate.
Figure 18A:
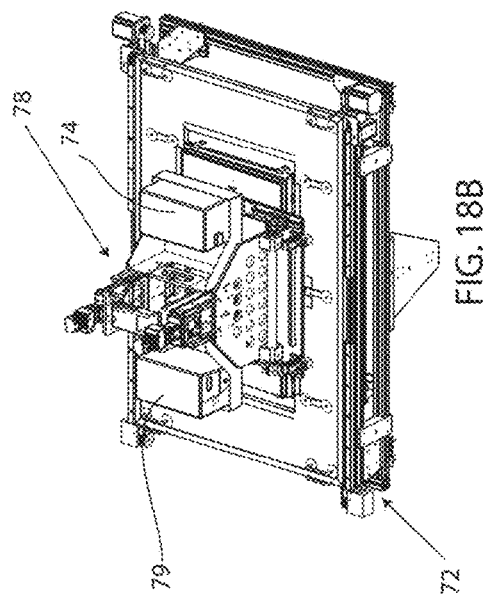
FIG. 18A depicts a top view of an embodiment of the third end effector lowering at an angle onto the first substrate.
Figure 18B:
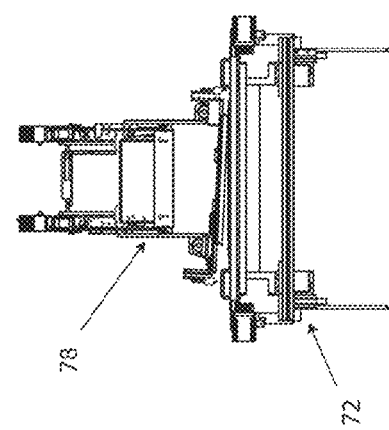
FIG. 18B depicts a perspective view of an embodiment of the third end effector lowering at an angle onto the first substrate.
Figure 18C:
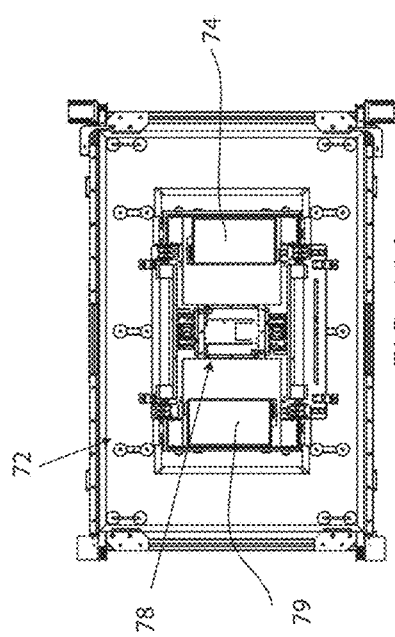
FIG. 18C depicts a front view of an embodiment of the third end effector lowering at an angle onto the first substrate.
Figure 18D:
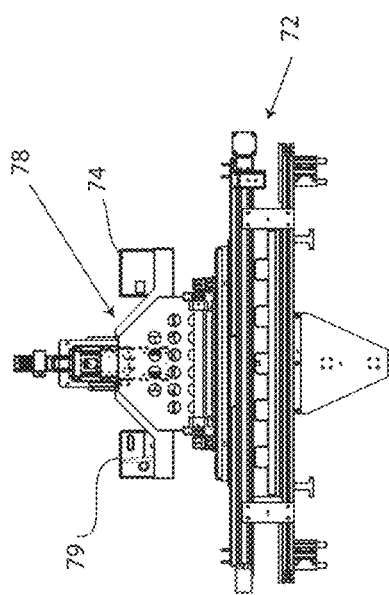
FIG. 18D depicts a side view of an embodiment of the third end effector lowering at an angle onto the first substrate.
Figure 19B:
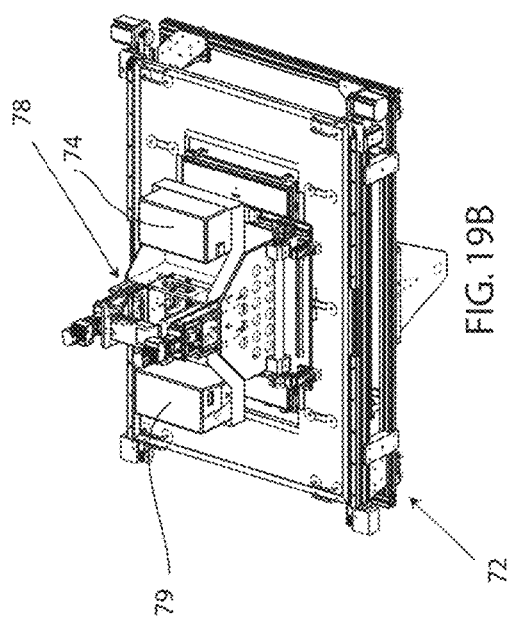
FIG. 19B depicts a perspective view of an embodiment of the third end effector as the first substrate and the second substrate are bonded.
Figure 19D:
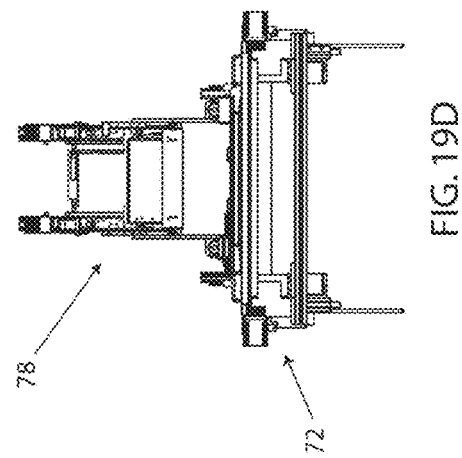
FIG. 19D depicts a side view of an embodiment of the third end effector as the first substrate and the second substrate are bonded.
Figure 19A:
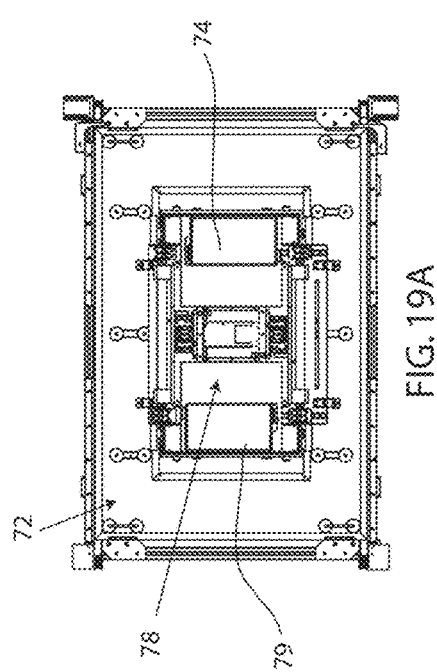
FIG. 19A depicts a top view of an embodiment of the third end effector as the first substrate and the second substrate are bonded.
Figure 19C:
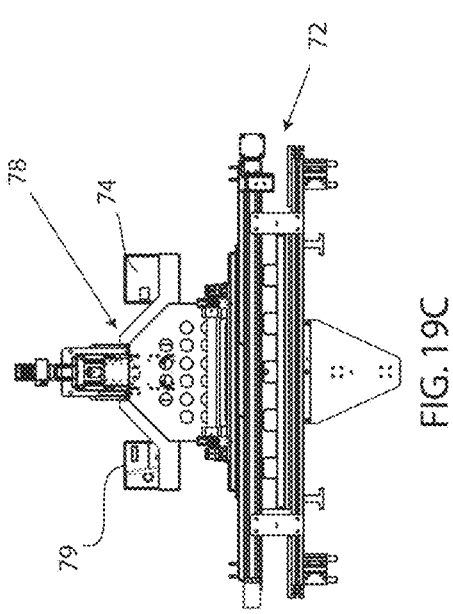
FIG. 19C depicts a front view of an embodiment of the third end effector as the first substrate and the second substrate are bonded.
Figure 20A:
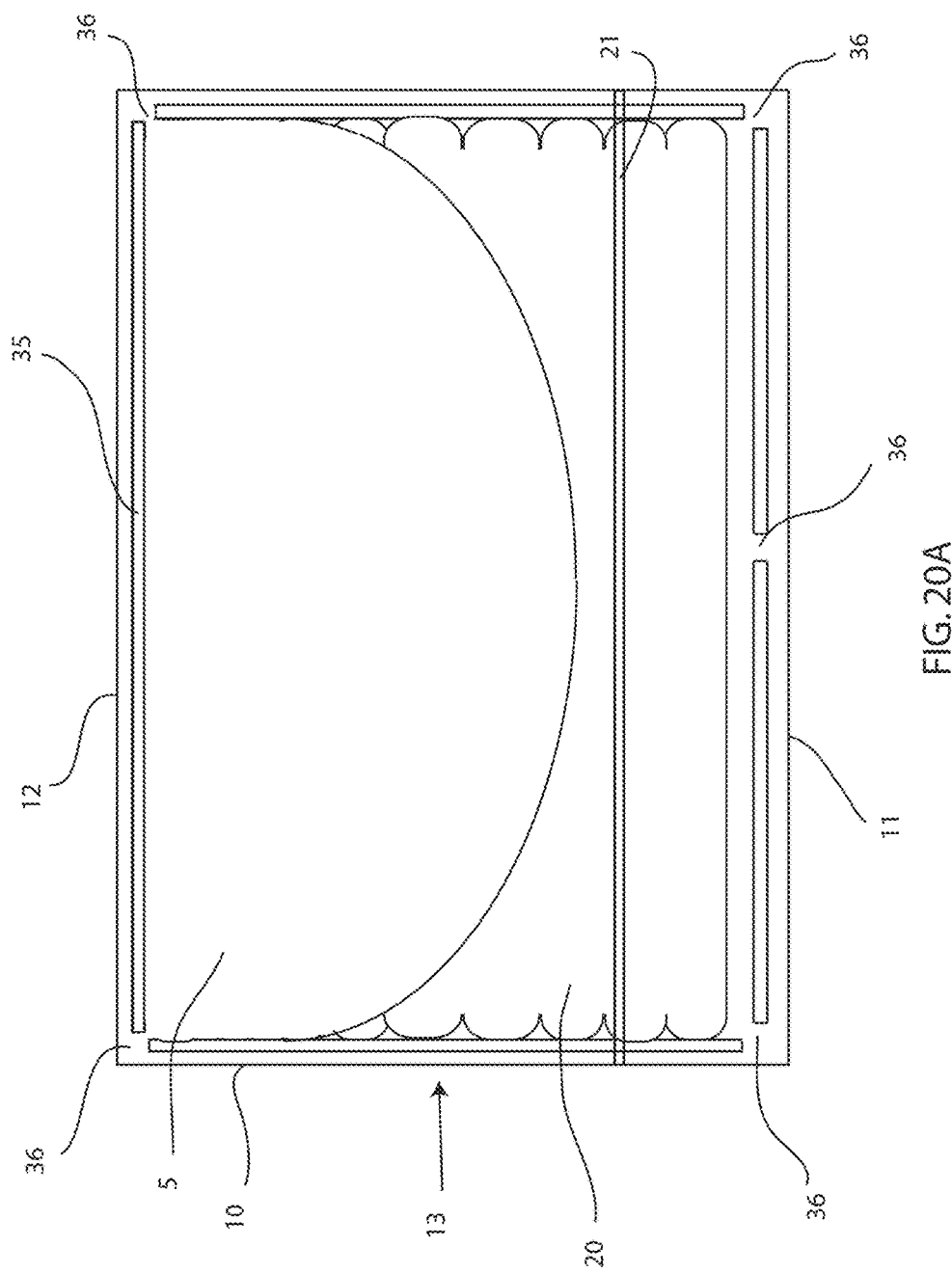
FIG. 20A depicts a top view of a first embodiment of a second substrate lowering onto the first substrate causing a capillary effect on the fill material.

Moreover, controllably lowering the second substrate 20 onto the first substrate 10 may force the fill material 5 to create a capillary or wave effect as it flows across the surface of the first substrate 10 and/or second substrate 20, as shown in FIG. 20A. In a first embodiment, air bubbles, formations, pockets, etc., may be prevented or eliminated because at the initial point of contact between the rear edge 12 of the first substrate 10 and the front edge 21 of the second substrate 20, the second substrate 20 may immediately contact the fill material 5. Contact with the fill material 5 may be ensured because the largest fill height, h, is proximate the rear edge 12 of the first substrate 10. Thus, the fill height, h, proximate the rear edge 12 of the first substrate 10 may equal the height necessary to make immediate contact with the second substrate 20 as the third end effector 78 places the second substrate 20 into an initial contact position, as shown in FIG. 17D. As the second substrate 20 is controllably lowered onto the first substrate 10, the fill material 5 may immediately begin flowing outward and towards the front edge 11 of the first substrate 10. The varying (or declining fill height, h, from rear edge 12 to front edge 11) fill height, h, across the surface of the first substrate 10 may allow the smooth, wavelike flow of the fill material 5, and may avoid overflow over the dam or fill material 5 passing through the vents 36 in unnecessary excess.

In a second embodiment, air bubbles, formations, pockets, etc., may be prevented or eliminated because at the initial point of contact between the first substrate 10 and the second substrate 20, the second substrate 20 may immediately contact the fill material 5 at a middle portion 13, 23 of the substrates 10, 20. Contact with the fill material 5 may be ensured because the largest fill height, h, is proximate or otherwise near the middle portion 13 of the first substrate 10. Thus, the fill height, h, proximate the middle portion 13 of the first substrate 10 may equal the height necessary to make immediate contact with the second substrate 20 as the third end effector 78 places the second substrate 20 into an initial contact position, as shown in FIG. 16D. As the second substrate 20 is controllably lowered onto the first substrate 10, the fill material 5 may immediately begin flowing outwards towards the front edge 11 and rear edge 12 of the first substrate 10. The varying (or declining fill height, h, from the middle portion 13 to the front edge 11 in one direction and to the rear edge 12 in an opposite direction) fill height, h, across the surface of the first substrate 10 may allow the smooth, wavelike flow of the fill material 5, and may avoid overflow over the dam or fill material 5 passing through the vents 36 in unnecessary excess.

Accordingly, the capillary effect, or wavelike flow, of the fill material 5 may prevent and eliminate the formation of air pockets during the bonding process, regardless of the size of the substrates 10, 20, as shown in FIG. 20B. The third end effector 78 may controllably lower the second substrate 20 onto the first substrate 10 until the first and second substrates 10, 20 are bonded, as shown in FIGS. 19A-19D. In other words, the third end effector 78 may lower the second substrate 20 onto the first substrate 10 until the angle between the first substrate 10 and the second substrate 20 is 0° (i.e. flat), or until no space exists between the first and second substrates 10, 20.

Further embodiments of the third machine 70 of system 100 may include a vision system 79 coupled to the third end effector 78 and a heating system. The vision system 79 may be a camera or other suitable vision system capable of detecting the orientation, location, position, etc. of parts, such as the first substrate 10 and the second substrate 20, within the third machine 70. Moreover, the heating system may include a heated valve(s) or other device for applying heat to the first and second substrates 10, 20.

Figure 21:
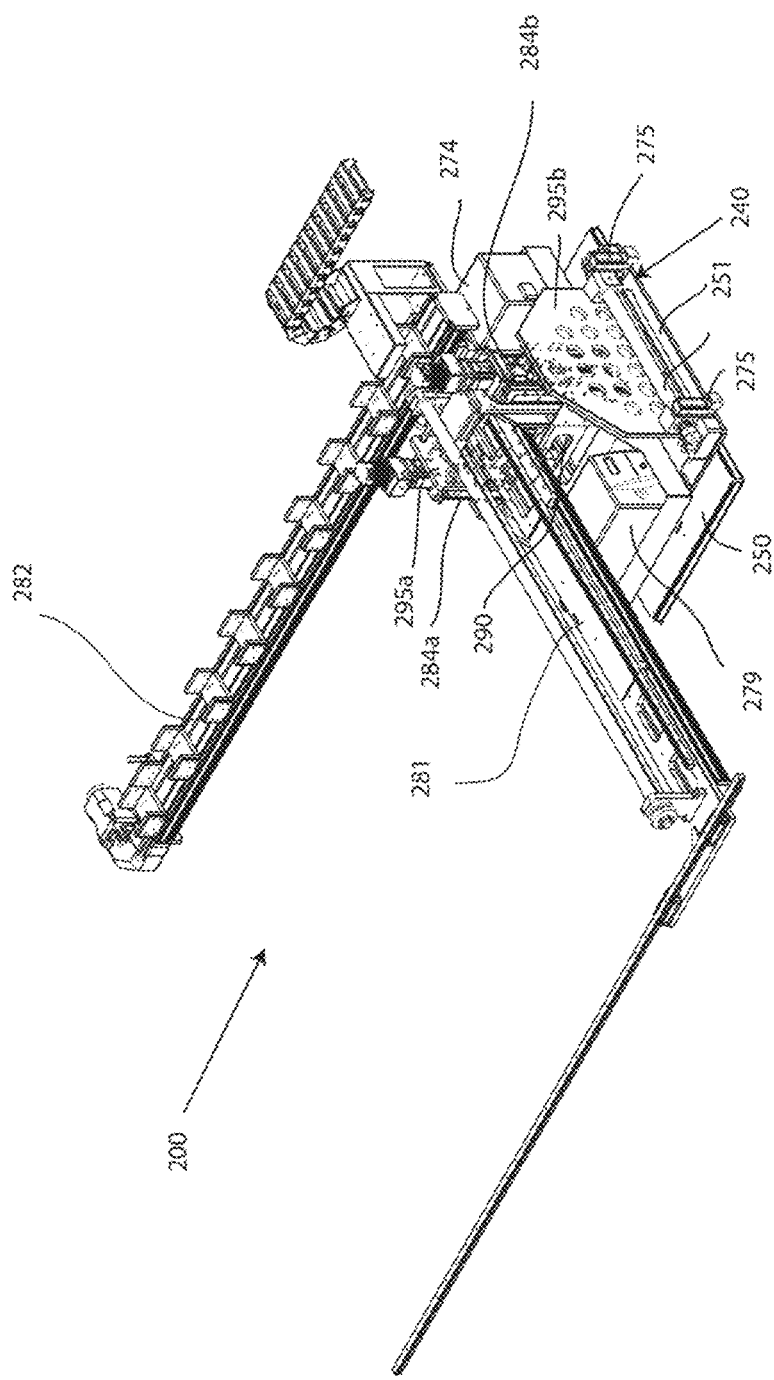
FIG. 21 depicts a perspective view of an embodiment of a robotic placement machine.
Figure 22:
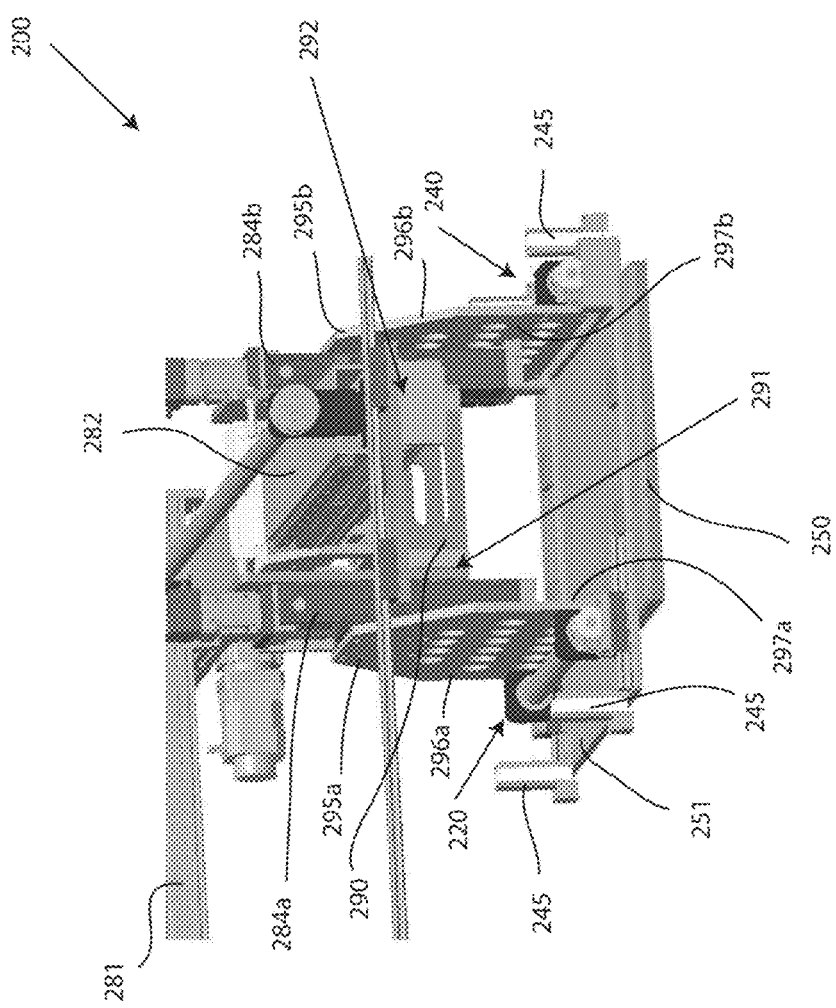
FIG. 22 depicts a perspective view of an embodiment of the robotic placement machine, wherein the pick and place plate is in a horizontal position.
Figure 23:
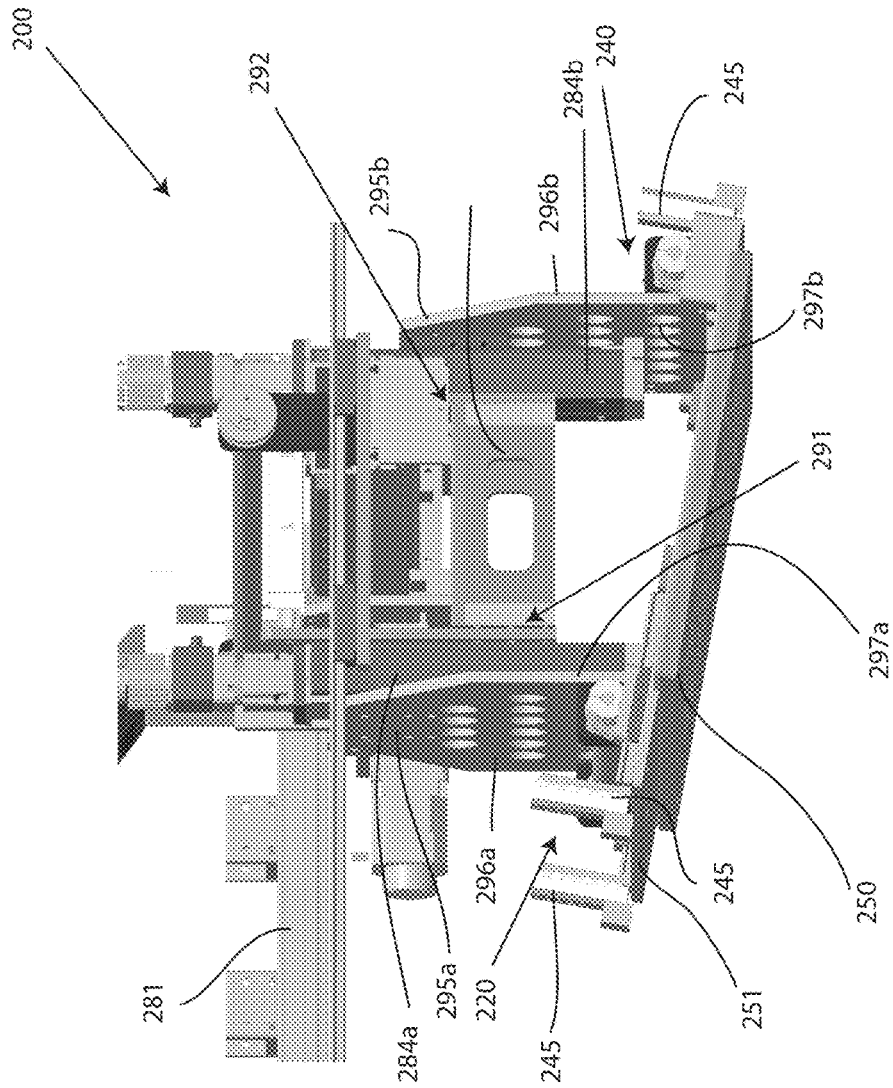
FIG. 23 depicts a perspective view of an embodiment of the robotic placement machine, wherein the pick and place plate is in a tilted position.

Referring now to FIGS. 21-23, an embodiment of a robotic placement machine 200 is shown. The robotic placement machine 200 may be used to place a first substrate 10, including a transparent substrate, onto a second substrate 20. Generally, robotic placement machine 200 is used for optical bonding and similar glass lamination methods and systems. The robotic placement machine 200 may be configured to attach to a robotic platform capable of performing automated tasks with accuracy, precision, and repeatability. For example, robotic placement machine 200 may be attached to a Gantry robot, or other robotic manipulator such as a selective compliant assembly robot arm (SCARA) system, linear robot, multi-axis robot arm system, and the like. Furthermore, the robotic placement machine 200 may move left and right along the Y axis by sliding along the Y axis actuator 282, and move back and forth along the X axis by sliding with the Y axis actuator 282 as it slides along the X axis actuator 281. The X axis actuator 281 may be interchangeable with the Y axis actuator 282. The X axis actuator 81 and the Y axis actuator 82 may be a ball screw slide, linear motion slide, a linear actuator, and the like.

Embodiments of the robotic placement machine 200 may further include a base 290 operably connected to the Y axis actuator 282, at least two independent Z actuators 284a, 284b, at least two mounting plates 295a, 295b, at least two bearing systems 220, 240, a pick and place plate 250, an underside 251, at least one UV wand 275, a height sensor 274, and a vision system 279. Further embodiments of the robotic placement machine 200 may be configured to attach, or may have, a Y-axis actuator 282 for moving left and right along an Y axis and a X-axis actuator 281 for moving back and forth along an X axis, and a base 290 operably connectable to at least one of the Y-axis actuator 281 and the X-axis actuator 281, the base 290 having a first end 291 and a second end 291, a first Z axis actuator 284a coupled to the first end 291 of the base 290, the first Z-axis actuator 284a capable of moving up and down a first Z axis, a second Z axis actuator 284b coupled to the second end 292 of the base 290, the second Z axis actuator 284b capable of moving up and down a second Z axis, and a pick and place plate 250 operably connected to the first Z axis actuator 284a and the second Z axis actuator 284b, wherein the first Z axis actuator 284a and the second Z axis actuator 284b are each capable of moving independently of each other to tilt the pick and place plate 250.

Referring still to FIGS. 21-23, embodiments of a robotic placement machine 200 may include a base 290 operably connected to the Y axis actuator 282. The base 290 may be directly or indirectly connected to the Y axis actuator 282. The base 290 may be rigidly fixed to the Y axis actuator 282 or dynamically coupled to the Y axis actuator 282. Alternatively, the base 290 may be suspended from the Y axis actuator 282. The base 290 may be a single structural component or a combination of structural components formed by rigid materials or by a combination of rigid and flexible materials that may provide structural integrity to the robotic placement machine 200. The base 290 may have a first end 291 and a second end 292. The first Z axis actuator 284a may be coupled to the first end 291 of the base 290. Similarly, the second Z axis actuator 284b may be coupled to the second end 292 of the base 290. Embodiments of the first and second Z axis actuators 284a, 284b may be a ball screw slide, linear motion slide, a linear actuator, and the like. The first Z-axis actuator 284a may operate independently of the second Z-axis actuator 284b, but may function in unison as required. Accordingly, each Z axis actuator 284a, 284b may be actuated at different times, different speeds, etc. Thus, the first Z axis actuator 284a and the second Z axis actuator 284b are each capable of moving independently of each other to tilt the pick and place plate 250, and return the pick and place plate 250 back to a horizontal or substantially horizontal position.

Through simultaneous actuation of the first and second Z axis actuators 284a, 284b, the robotic placement machine 200 may move up and down, while keeping the pick and place plate 250 horizontal or substantially horizontal. Additionally, simultaneous actuation of the first and second Z axis actuators 284a, 284b may move the robotic placement machine 200 up and down, while the pick and place plate 250 is tilted at an angle, maintaining the tilt angle during movement. Through independent actuation of the first and second Z axis actuators 284a, 284b, the robotic placement machine 200 may move or tilt the pick and place plate 250 from 0° to 20° with respect to a horizontal position. In some embodiments, independent actuation of the first and second Z axis actuators 284a, 284b may achieve tilt of the pick and place plate 250 and movement up and down along a Z axis.

Embodiments of robotic placement machine 200 may also include a first mounting plate 295a coupled to the first Z-axis actuator 284a, wherein the first Z-axis actuator 284a is coupled to a second surface 297a of the mounting plate 295a. Similarly, embodiments of robotic placement machine 200 may include a second mounting plate 295b coupled to the second Z-axis actuator 284b, wherein the second Z-axis actuator 284b is coupled to a second surface 297b of the second mounting plate 295b. A mounting plate, such as mounting plates 295a, 295b may be any component(s), rigid or otherwise, that may be used to connect, secure, attach, etc., the first and second Z axis actuator 284a, 284b to a first and second bearing system 220, 240, respectively. For instance, a first bearing system 220 may be coupled to a first surface 296a of the first mounting plate 295a. Similarly, a second bearing system 240 may be coupled to a first surface 296b of the second mounting plate 295b. The operable communication between the first and second Z-axis actuators 284a, 284b may allow the robotic placement machine 200 to tilt as a single unit. In other words, the first and second bearing systems 220, 240 may mechanically allow and/or facilitate the tilt of the pick and place plate 250. Furthermore, first and second bearing systems 220, 240 may improve the efficiency and reduce the friction resulting from the actuation of the first and second Z axis actuators 284a, 284b. Embodiments of the first and second bearing systems 220, 240 may include a bearing fitted within a housing fastened to the underside, capable of supporting a shaft to facilitate the tilt of the pick and place plate 250. Those skilled in the requisite art should appreciate that other bearing systems may be employed to facilitate the tilting of the robotic placement machine 200, and should not be limited to the embodiments disclosed herein.

Moreover, the first and second bearing systems 220, 240 may also be coupled to an underside 251 or support substrate of the robotic placement machine 200. The underside 251 may be coupled, or in mechanical communication with a pick and place plate 250. In some embodiments, the robotic placement machine 200 may include more than one pick and place plate 250 coupled to the underside 251. The pick and place plate 250 may be configured to pick, secure, grab, attach to, etc. a transparent substrate, such as second substrate 10. The pick and place plate 250 may be a vacuum plate configured to lock onto a substrate for controllable placement onto another substrate, such as first substrate 10.

Further embodiments of robotic placement machine 200 may include at least one UV wand 275 positioned on the underside 251. The UV wands 245 may have the same structure and function of UV wand 45, described supra. Embodiments of robotic placement machine 200 may include a plurality of UV wands 245 positioned proximate the edges of the underside 251 at locations where vents, such as vents 36, may exist on a dam, such as dam 35, wherein the dam is along a perimeter of a substrate configured to be bonded to another substrate placed by robotic placement machine 200. The UV wands 245 may stabilize UV material used as dam and/or fill material, and may function when the robotic placement machine 200 has placed a substrate onto another substrate having a dam, wherein the bonding may disrupt the dam material. Embodiments of robotic placement machine 200 may also include a height sensor 274 to detect a surface height of a substrate. Height sensor 274 may share the same function and structure as height sensor 74, described supra. Further embodiments of robotic placement machine 200 may include a vision system 279 to detect an orientation of components associated with the robotic placement machine 200. The vision system 279 may share the same function and structure as vision system 79, described supra.

With reference to FIGS. 1-23, a first method of optical bonding is now described. The method of optical bonding may include the steps of dispensing a fill material 5 across a surface of the first substrate 10 to achieve a largest fill height, h, proximate a rear edge 12 of the first substrate 10 and a lowest fill height, h, proximate a front edge 11 of the first substrate 10, placing a second substrate 20 into contact with the fill material 5 proximate the rear edge 12 of the first substrate 10 at an angle relative to the first substrate 10, and controllably lowering the second substrate 20 onto the first substrate 10 until the second substrate 20 is bonded to the first substrate 10 to prevent and eliminate air bubbles between the first and second substrates 10, 20. Further steps may include tracing providing a first substrate 10, dispensing dam material around a perimeter of the first substrate 10 to form a dam 35 (although some embodiments of the method may not include forming a dam; the frame may act as a dam), the dam material with a UV wand 45 to stabilize the dam material, treating the surface of the first substrate 10 with a treatment head 53 prior to dispensing fill material 5 onto the surface of the first substrate 10, locating and aligning the second substrate 20 for placement onto first substrate 10, locating the rear edge 12 of the first substrate 10 with a height sensor 74, and placing the bonded substrates into a cure oven.

Referring again to FIGS. 1-23, a second method of optical bonding is now described. The method of optical bonding may include the steps of dispensing a fill material 5 across a surface of the first substrate 10 to achieve a largest fill height, h, proximate a middle portion 13 of the first substrate 10, placing a second substrate 20 into contact with the fill material 5 proximate the middle portion 13 of the first substrate 10 substantially parallel or parallel to the first substrate 10, and controllably lowering the second substrate 20 onto the first substrate 10 until the second substrate 20 is bonded to the first substrate 10 to prevent and eliminate air bubbles between the first and second substrates 10, 20. Further steps may include tracing providing a first substrate 10, dispensing dam material around a perimeter of the first substrate 10 to form a dam 35 (although some embodiments of the method may not include forming a dam; the frame may act as a dam), the dam material with a UV wand 45 to stabilize the dam material, treating the surface of the first substrate 10 with a treatment head 53 prior to dispensing fill material 5 onto the surface of the first substrate 10, locating and aligning the second substrate 20 for placement onto first substrate 10, locating a rear edge 12 of the first substrate 10 with a height sensor 74, and placing the bonded substrates into a cure oven.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A robotic placement machine configured to attach to a Y-axis actuator for moving along a Y-axis and a X-axis actuator for moving along an X-axis, the robotic placement machine comprising:
    a base operably connectable to at least one of the Y-axis actuator and the X-axis actuator, the base having a first end and a second end;
    a first Z-axis actuator coupled to the first end of the base, the first Z-axis actuator capable of moving up and down a first Z-axis;
    a second Z-axis actuator coupled to the second end of the base, the second Z-axis actuator capable of moving up and down a second Z-axis;
    and a pick and place plate operably connected to the first Z-axis actuator and the second Z axis actuator;
    wherein the first Z-axis actuator and the second Z-axis actuator are each capable of moving independently of each other so that the robotic placement machine tilts the pick and place plate.

2. The robotic placement machine of claim 1, further comprising:
    a first mounting plate having a first surface and a second surface, wherein the first Z-axis actuator is coupled to the first mounting plate;
    a second mounting plate having a first surface and a second surface, wherein the second Z-axis actuator is coupled to the second mounting plate;
    a first bearing system coupled to the first surface of the first mounting plate; and
    a second bearing system coupled to the first surface of the second mounting plate;
    wherein the first bearing system and the second bearing system mechanically allow tilting of the pick and place plate.

3. The robotic placement machine of claim 2, wherein the first and second bearing systems each include a bearing fitted within a housing fastened to an underside, capable of supporting a shaft to facilitate the tilt of the pick and place plate.

4. The robotic placement machine of claim 1, wherein the pick and place plate is coupled to the underside, the underside coupled to the first bearing system and the second bearing system.

5. The robotic placement machine of claim 1, further comprising:
    a height sensor coupled to the base to detect a surface height of a substrate;
    a plurality of UV light wands coupled to the underside; and
    a vision system coupled to the base to detect an orientation of components associated with the robotic placement machine.

6. The robotic placement machine of claim 1, wherein the pick and place plate is a vacuum plate for picking and placing the substrate.

7. The robotic placement machine of claim 1, wherein movement of the robotic placement machine is computer programmable.

8. A robotic placement machine configured to attach to a Y-axis actuator for moving along a Y-axis and a X-axis actuator for moving along an X-axis, the robotic placement machine comprising:
    a base operably connectable to at least one of the Y-axis actuator and the X-axis actuator, the base having a first end and a second end; a first Z-axis actuator coupled to the first end of the base, the first Z-axis actuator capable of moving up and down a first Z-axis; a second Z-axis actuator coupled to the second end of the base, the second Z-axis actuator capable of moving up and down a second Z-axis; and a pick and place plate operably connected to the first Z-axis actuator and the second Z-axis actuator;
    wherein simultaneous robotic actuation of the first Z-axis actuator and the second Z-axis
    actuator moves the robotic placement machine up and down while keeping the pick and place plate at an angle between 0°-20°.

9. The robotic placement machine of claim 8, further comprising:
    a first mounting plate having a first surface and a second surface, wherein the first Z-axis actuator is coupled to the first mounting plate;
    a second mounting plate having a first surface and a second surface, wherein the second Z-axis actuator is coupled to the second mounting plate;
    a first bearing system coupled to the first surface of the first mounting plate; and
    a second bearing system coupled to the first surface of the second mounting plate;
    wherein the first bearing system and the second bearing system mechanically allow tilting of the pick and place plate.

10. The robotic placement machine of claim 9, wherein the first and second bearing systems each include a bearing fitted within a housing fastened to an underside, capable of supporting a shaft to facilitate the tilt of the pick and place plate.

11. The robotic placement machine of claim 8, wherein the pick and place plate is coupled to the underside, the underside coupled to the first bearing system and the second bearing system.

12. The robotic placement machine of claim 8, further comprising:
    a height sensor coupled to the base to detect a surface height of a substrate;

a plurality of UV light wands coupled to the underside; and a vision system coupled to the base to detect an orientation of components associated with the robotic placement machine.

13. The robotic placement machine of claim 8, wherein the pick and place plate is a vacuum plate for picking and placing the substrate.

14. The robotic placement machine of claim 8, wherein movement of the robotic placement machine is computer programmable.

15. A method comprising:

providing a robotic placement machine configured to attach to a Y-axis actuator for moving along a Y-axis and a X-axis actuator for moving along an X-axis, the robotic placement machine including a base operably connectable to at least one of the Y-axis actuator and the X-axis actuator, the base having a first end and a second end, a first Z-axis actuator coupled to the first end of the base, the first Z-axis actuator capable of moving up and down a first Z-axis, a second Z-axis actuator coupled to the second end of the base, the second Z-axis actuator capable of moving up and down a second Z-axis, and a pick and place plate operably connected to the first Z-axis actuator and the second Z-axis actuator;

independently actuating the first Z-axis actuator and the second Z-axis actuator so that the robotic placement machine controls a tilt of the pick and place plate; and simultaneously actuating the first Z-axis actuator and the second Z-axis actuator to control an up and down movement of the pick and place plate.

16. The method of claim 15, wherein a movement of the robotic placement machine is computer programmable.

* * * * *